(12) United States Patent
Nagy et al.

(10) Patent No.: US 11,352,585 B2
(45) Date of Patent: Jun. 7, 2022

(54) PURIFICATION OF TRIACYLGLYCERIDE OILS

(71) Applicant: SOCIETE DES PRODUITS NESTLE S.A., Vevey (CH)

(72) Inventors: Kornel Nagy, La Tour-de-Peilz (CH); Karine Meisser Redeuil, Pully (CH); Sabine Lahrichi, Montreux (CH); Marine Nicolas, Lausanne (CH); Xanthippi Theurillat, Cheseaux-sur-Lausanne (CH)

(73) Assignee: Societe des Produits Nestle S.A., Vevey (CH)

(*) Notice: Subject to any disclaimer, the term of this patent is extended or adjusted under 35 U.S.C. 154(b) by 0 days.

(21) Appl. No.: 16/980,569

(22) PCT Filed: Mar. 13, 2019

(86) PCT No.: PCT/EP2019/056306
§ 371 (c)(1),
(2) Date: Sep. 14, 2020

(87) PCT Pub. No.: WO2019/175256
PCT Pub. Date: Sep. 19, 2019

(65) Prior Publication Data
US 2021/0002582 A1  Jan. 7, 2021

(30) Foreign Application Priority Data

Mar. 14, 2018 (EP) .................................. 18161660
Oct. 11, 2018 (EP) .................................. 18199763
Dec. 19, 2018 (EP) .................................. 18214128

(51) Int. Cl.
*C11B 3/00* (2006.01)
*B01D 21/26* (2006.01)
(Continued)

(52) U.S. Cl.
CPC .............. *C11B 3/001* (2013.01); *B01D 21/02* (2013.01); *B01D 21/262* (2013.01); *C11B 3/006* (2013.01);
(Continued)

(58) Field of Classification Search
CPC . C11B 3/001; C11B 3/006; C11B 3/16; C11B 3/0075; C11B 3/0083; B01D 21/262
See application file for complete search history.

(56) References Cited

U.S. PATENT DOCUMENTS 9,051,260 B2 * 6/2015 Rongione ............. C07C 51/412
2014/0018559 A1 * 1/2014 Nagy ........................ C11B 3/10
554/21
2014/0018560 A1 * 1/2014 Sandoz ................... C11B 3/006
554/191

FOREIGN PATENT DOCUMENTS

EP         2471897         7/2012
EP         2471897  A1 *  7/2012  ............... C11B 3/10
(Continued)

OTHER PUBLICATIONS

Seefelder et al. "Esters of 3-chloro-1,2-propanediol (3-MCPD) in vegetable oils: Significance in the formation of 3-MCPD" Food Additives and Contaminants, Apr. 2008, vol. 25, No. 4, pp. 391-400.
(Continued)

*Primary Examiner* — Yate' K Cutliff
(74) *Attorney, Agent, or Firm* — K&L Gates LLP

(57) ABSTRACT

A method for purification of a triacylglyceride oil comprising the steps: (a) admixing the triacylglyceride oil with an auxiliary trapping agent, wherein the melting temperatures of the triacylglyceride oil and the auxiliary trapping agent are substantially different, wherein the auxiliary trapping agent is soluble in the triacylglyceride oil, and wherein the auxiliary trapping agent is more polar than the triacylglyceride oil; (b) (i) crystallising the auxiliary trapping agent by
(Continued)

cooling the mixture of step (a) below the melting temperature of the auxiliary trapping agent, wherein the auxiliary trapping agent has a higher melting temperature than the triacylglyceride oil; or (ii) crystallising the triacylglyceride oil by cooling the mixture of step (a) below the melting temperature of the triacylglyceride oil, wherein the triacylglyceride oil has a higher melting temperature than the auxiliary trapping agent; and (c) separating solid and liquid phases of the product of step (b).

16 Claims, 29 Drawing Sheets

(51) Int. Cl.

| | | |
|---|---|---|
| *C11B 3/16* | (2006.01) | |
| *C11B 7/00* | (2006.01) | |
| *B01D 21/02* | (2006.01) | |
| *A23D 9/04* | (2006.01) | |
| *C11B 1/10* | (2006.01) | |

(52) U.S. Cl.
CPC .............. *C11B 3/16* (2013.01); *C11B 7/0075* (2013.01); *A23D 9/04* (2013.01); *C11B 1/10* (2013.01)

(56) References Cited

FOREIGN PATENT DOCUMENTS

| | | | |
|---|---|---|---|
| EP | 2502500 | 9/2012 | |
| KR | 20130130387 | 12/2013 | |
| WO | 9526391 | 10/1995 | |
| WO | WO9526391 A1 * | 10/1995 | ............... C11B 3/00 |
| WO | WO2011009843 * | 1/2011 | ............... C11B 3/14 |

OTHER PUBLICATIONS

Ermacora et al. "Influence of oil composition on the formation of fatty acid esters of 2-chloropropane-1,3-diol (2-MCPD) and 3-chloropropane-1,2-diol (3-MCPD) under conditions simulating oil refining" Food Chemistry, 2014, vol. 161, pp. 383-389.

* cited by examiner

PURIFICATION OF TRIACYLGLYCERIDE OILS

CROSS REFERENCE TO RELATED APPLICATIONS

The present application is a National Stage of International Application No. PCT/EP2019/056306, filed on Mar. 13, 2019, which claims priority to European Patent Application No. 18161660.8, filed on Mar. 14, 2018, European Patent Application No. 18199763.6, filed on Oct. 11, 2018, and European Patent Application No. 18214128.3, filed Dec. 19, 2018, the entire contents of which are being incorporated herein by reference.

FIELD OF THE INVENTION

The present invention relates to the purification of oils. In particular, the invention relates to the purification of triacylglyceride oils from contaminant chlorinated precursors of monochloropropandiol esters (MCPDEs) and/or MCPDEs themselves.

BACKGROUND TO THE INVENTION

3-Halogen-1,2-propandiols, in particular 3-monochloro-1,2-propandiol (3-MCPD), are known contaminants in foods (Food Addit. Contam. (2006) 23: 1290-1298). For example, studies have indicated that 3-MCPD may be carcinogenic to rats if administered at high doses (Evaluation of Certain Food Additives and Contaminants, World Health Organisation, Geneva, Switzerland (1993) 267-285; Int. J. Toxicol. (1998) 17: 47).

3-MCPD was originally found in acid-hydrolysed vegetable protein (acid-HVP; Z. Lebensm.-Unters. Forsch. (1978) 167: 241-244). More recently, it was found that refined edible oils may contain 3-MCPD in its fatty acid ester form, but only very little amounts of free 3-MCPD (Food Addit. Contam. (2006) 23: 1290-1298). The European Food Safety Authority (EFSA) has recommended that 3-MCPD esters are treated as equivalent to free 3-MCPD in terms of toxicity (European Food Safety Authority (2008)).

It has been reported that chlorination of acylglycerides can occur at very high temperatures, for example during the final step of the oil refining process, or deodorisation, under which oils may be heated under vacuum (3-7 mbar) up to 260-270° C. This may result in the formation of fatty acid esters of MCPD.

Effective mitigation routes for MCPD esters are limited and pose a challenge to the plant oil refining industry. Currently, the presence of 3-MCPD in refined oils is carefully monitored and oils with 3-MCPD content above a threshold value are discarded in order to ensure full compliance with EFSA recommendations. One key complication hindering effective mitigation of these contaminants is that the chlorine carrying precursors are not removed before the deodorisation step and thus can act as the source/donor of chlorine during the deodorisation step.

As 3-MCPD may occur in many refined commercially important oils, such as plant oils, there exists a significant need for improved methods for removing and/or avoiding the production of such contaminants during oil refining.

SUMMARY OF THE INVENTION

The inventors have developed a method through which MCPD ester generation during the process of oil refining can be substantially reduced or prevented.

The inventors have developed a method in which triacylglyceride oils are subjected to treatment with auxiliary agents to trap polar chlorinated substances, which may for example be an active source of chlorine during oil refining. The trapped chlorinated substances may then be physically separated by crystallising either the auxiliary agents from the oil or vice versa. The crystallisation may be assisted through use of a range of auxiliary agents that can be chosen based on melting point and/or polarity, for example.

Once removed, the potential chlorine donors are no longer available for the generation of chlorinated compounds, such as MCPD esters and MCPD di-esters during the heating steps in oil refinement. Product oils low in chlorinated substances are thereby obtained and the purified oils may be subjected to various refining practices, such as heat treatment and deodorisation, in order to produce refined oils low in or free from MCPDEs.

Through utilisation of auxiliary trapping agents, the invention is not limited to a particular type of triacylglyceride oil, but is broadly applicable to various fats and oils, such as sunflower oil, corn oil, canola oil, soybean oil, coconut oil, palm oil and palm kernel oil. Depending on the composition and physicochemical characteristics of the oil, the removal of the chlorinated precursors is assisted by using a more polar auxiliary lipid trapping agent that facilitates both the solubilisation of the MCPDE precursors and at the same time the physical separation process (e.g. either by crystallising out from the bulk or remaining a liquid supernatant upon cooling). The choice of the auxiliary trapping agent may be a single component or blends of components, such as monoacylglycerides, diacylglycerides and other lipid soluble substances that are more polar than the original primary oil.

A further benefit of the method of the invention is that it enables lower temperatures to be used in deodorisation of the oil, which reduces trans-fatty acid formation (trans fat formation at high temperature is reviewed in Baley's industrial oil and fat products; Sixth Edition; Volume 5 Edible Oil and Fat Products: Processing Technologies; Chapter 8 Deodorization; section 3. Refined oil quality, subsection 3.2 Fat isomerization and degradation products).

Accordingly, in one aspect the invention provides a method for purification of a triacylglyceride oil comprising the steps:
  (a) admixing the triacylglyceride oil with an auxiliary trapping agent, wherein the melting temperatures of the triacylglyceride oil and the auxiliary trapping agent are substantially different, wherein the auxiliary trapping agent is soluble in the triacylglyceride oil, and wherein the auxiliary trapping agent is more polar than the triacylglyceride oil;
  (b) (i) crystallising the auxiliary trapping agent by cooling the mixture of step (a) below the melting temperature of the auxiliary trapping agent, wherein the auxiliary trapping agent has a higher melting temperature than the triacylglyceride oil; or
    (ii) crystallising the triacylglyceride oil by cooling the mixture of step (a) below the melting temperature of the triacylglyceride oil, wherein the triacylglyceride oil has a higher melting temperature than the auxiliary trapping agent; and
  (c) separating solid and liquid phases of the product of step (b).

In another aspect the invention provides a method for purification of a triacylglyceride oil comprising the steps:
  (a) admixing the triacylglyceride oil with an auxiliary trapping agent, wherein the auxiliary trapping agent has a higher melting temperature than the triacylglyceride oil, wherein the auxiliary trapping agent is soluble in the triacylglyceride oil, and wherein the auxiliary trapping agent is more polar than the triacylglyceride oil;

(b) crystallising the auxiliary trapping agent by cooling the mixture of step (a) below the melting temperature of the auxiliary trapping agent; and (c) separating solid and liquid phases of the product of step (b).

In one embodiment, the melting temperature of the auxiliary trapping agent is at least 10° C. higher than the melting temperature of the triacylglyceride oil. In a preferred embodiment, the melting temperature of the auxiliary trapping agent is at least 20° C. higher than the melting temperature of the triacylglyceride oil.

In another aspect the invention provides a method for purification of a triacylglyceride oil comprising the steps:

(a) admixing the triacylglyceride oil with an auxiliary trapping agent, wherein the triacylglyceride oil has a higher melting temperature than the auxiliary trapping agent, wherein the auxiliary trapping agent is soluble in the triacylglyceride oil, and wherein the auxiliary trapping agent is more polar than the triacylglyceride oil;

(b) crystallising the triacylglyceride oil by cooling the mixture of step (a) below the melting temperature of the triacylglyceride oil; and (c) separating solid and liquid phases of the product of step (b).

In one embodiment, the melting temperature of the triacylglyceride oil is at least 10° C. higher than the melting temperature of the auxiliary trapping agent. In a preferred embodiment, the melting temperature of the triacylglyceride oil is at least 20° C. higher than the melting temperature of the auxiliary trapping agent.

In one embodiment, the quantity of chlorinated precursors of monochloropropandiol esters (MCPDEs) is reduced in the purified triacylglyceride oil compared to the starting triacylglyceride oil.

In one embodiment, the starting triacylglyceride oil is crude triacylglyceride oil.

In one embodiment, the triacylglyceride oil has not been refined before step (a). In one embodiment, the triacylglyceride oil has not been degummed before step (a). In one embodiment, the triacylglyceride oil has not been bleached before step (a). In one embodiment, the triacylglyceride oil has not been fractionated before step (a).

In a preferred embodiment, the triacylglyceride oil has not been deodorised before step (a).

In one embodiment, the triacylglyceride oil is subjected to preliminary cleaning before step (a). In one embodiment, the triacylglyceride oil is subjected to preliminary refining before step (a). In one embodiment, the triacylglyceride oil is subjected to fractionation before step (a). In one embodiment, the triacylglyceride oil is subjected to hydrogenation before step (a). In one embodiment, the triacylglyceride oil is subjected to interesterification before step (a).

In one embodiment, the difference in log $P_{oct/wat}$ between the auxiliary trapping agent and the triacylglyceride oil is at least 1. In a preferred embodiment, the difference in log $P_{oct/wat}$ between the auxiliary trapping agent and the triacylglyceride oil is at least 2.

In one embodiment, the auxiliary trapping agent comprises a glyceride. Thus, the auxiliary trapping agent may contain a glyceride and may also contain other compounds, although the auxiliary trapping agent is preferably primarily made up of glycerides. In another embodiment, the auxiliary trapping agent is a glyceride.

In one embodiment, the auxiliary trapping agent comprises at least one compound selected from the group consisting of a monoacylglyceride, a diacylglyceride and a free fatty acid. In another embodiment, the auxiliary trapping agent consists of one or more compounds selected from the group consisting of a monoacylglyceride, a diacylglyceride and a free fatty acid.

In one embodiment, the auxiliary trapping agent comprises a monoacylglyceride and/or a diacylglyceride. In another embodiment, the auxiliary trapping agent consists of a monoacylglyceride and/or a diacylglyceride.

In one embodiment, the auxiliary trapping agent comprises at least 60 wt %, 70 wt %, 80 wt %, 90 wt %, 95 wt %, 96 wt %, 97 wt %, 98 wt %, 99 wt % or 100 wt % monoacylglycerides and/or diacylglycerides.

In one embodiment, the auxiliary trapping agent comprises less than 2 wt % triacylglycerides.

In a preferred embodiment, the auxiliary trapping agent does not comprise any triacylglycerides.

In one embodiment, fatty acid chains of the auxiliary trapping agent are saturated or monounsaturated. In a preferred embodiment, fatty acid chains of the auxiliary trapping agent are all saturated.

In one embodiment, fatty acid chains of the auxiliary trapping agent have a chain length of at least 12. In another embodiment, fatty acid chains of the auxiliary trapping agent have a chain length of at least 14. In another embodiment, fatty acid chains of the auxiliary trapping agent have a chain length of at least 16. In another embodiment, fatty acid chains of the auxiliary trapping agent have a chain length of at least 18.

In one embodiment, fatty acid chains of the auxiliary trapping agent have a chain length of 12. In another embodiment, fatty acid chains of the auxiliary trapping agent have a chain length of 14. In a preferred embodiment, fatty acid chains of the auxiliary trapping agent have a chain length of 16. In another preferred embodiment, fatty acid chains of the auxiliary trapping agent have a chain length of 18.

In one embodiment, the auxiliary trapping agent comprises at least one compound selected from the group consisting of monostearin, monopalmitin, distearin, dipalmitin, stearic acid and palmitic acid. In another embodiment, the auxiliary trapping agent consists of one or more compounds selected from the group consisting of monostearin, monopalmitin, distearin, dipalmitin, stearic acid and palmitic acid.

In one embodiment, the auxiliary trapping agent comprises monostearin. In another embodiment, the auxiliary trapping agent is monostearin.

In one embodiment, the triacylglyceride oil is a plant oil, animal oil, fish oil or algal oil.

In a preferred embodiment, the triacylglyceride oil is a plant oil, preferably wherein the plant oil is selected from the group consisting of sunflower oil, corn oil, canola oil, soybean oil, coconut oil, palm oil, palm kernel oil and cocoa butter.

In one embodiment, the triacylglyceride oil is crude palm oil and the trapping agent is monostearin. In one embodiment, the triacylglyceride oil is crude canola seed oil and the trapping agent is monostearin. In one embodiment, the triacylglyceride oil is water degummed industrially produced crude palm oil and the trapping agent is monostearin. In one embodiment, the triacylglyceride oil is water degummed and acid degummed industrially produced crude palm oil and the trapping agent is monostearin. In one embodiment, the triacylglyceride oil is acid degummed solvent extracted crude palm oil and the trapping agent is monostearin. In one embodiment, the triacylglyceride oil is acid degummed industrially produced crude palm oil and the trapping agent is monostearin. In one embodiment, the triacylglyceride oil is neutralized oil from industrially produced crude palm oil and the trapping agent is monostearin. In one embodiment, the triacylglyceride oil is neutralized oil made from solvent extracted crude palm oil and the trapping agent is monostearin. Neutralized oil is alkali treated, as in alkaline/chemical refined.

In one embodiment, the admixing of step (a) comprises heating to a temperature greater than the melting temperatures of the triacylglyceride oil and auxiliary trapping agent, and/or homogenising the mixture.

In one embodiment, the admixing of step (a) comprises incubating the triacylglyceride oil and auxiliary trapping agent at a temperature greater than the melting temperatures of the triacylglyceride oil and auxiliary trapping agent, and/or homogenising the mixture.

In one embodiment, the separating of step (c) comprises centrifuging, decanting and/or filtering. In a preferred embodiment, the separating of step (c) comprises centrifuging.

In one embodiment, the amount of auxiliary trapping agent admixed with the triacylglyceride oil is at least 2 wt %, 3 wt %, 4 wt %, 5 wt %, 6 wt %, 7 wt %, 8 wt %, 9 wt % or 10 wt % of the triacylglyceride oil.

In one embodiment, the pH of the triacylglyceride oil is adjusted before step (b). The pH may be adjusted before step (b) to increase the polarity of chlorinated precursors of MCPDEs. In one embodiment, the pH of the triacylglyceride oil is decreased by about 0.5-2.0, for example decreased by about 0.5, 1.0, 1.5 or 2.0. In another embodiment, the pH of the triacylglyceride oil is increased by about 0.5-2.0, for example increased by about 0.5, 1.0, 1.5 or 2.0.

In one embodiment, the pH of the triacylglyceride oil is adjusted by addition of citric acid or phosphoric acid. In another embodiment, the pH of the triacylglyceride oil is adjusted by addition of a bicarbonate salt or a hydroxide salt, such as sodium bicarbonate or sodium hydroxide.

In one embodiment, the triacylglyceride oil is pre-treated before step (b), for example the triacylglyceride oil is admixed with acidified water before step (b). Similar pH treatment steps are commonly practised in physical refining (see, for example, "Degumming of oils and fats" in The Lipid Handbook, Third Edition by Frank D. Gunstone, John L. Harwood, Albert J. Dijkstra; Baley's industrial oil and fat products; Sixth Edition; Volume 5 Edible Oil and Fat Products: Processing Technologies; Chapter 1 A Primer on Oils Processing Technology; section 6. Degumming, Lecithin Processing, and Physical Refining Pretreatment). The solubilised acid content may be increased before step (b), for example to increase the protonated form and/or polarity of chlorinated precursors of MCPDEs. In one embodiment, the triacylglyceride oil is admixed with water acidified by addition of citric acid or phosphoric acid. For example, 0.1-1 wt % acid solution containing 70-85% phosphoric acid can be used.

In another embodiment, the triacylglyceride oil is admixed with a base (such as caustic soda, NaOH) or its water solution. Similar pH treatment steps are commonly practised in chemical refining/neutralisation of oils (see, for example, "Alkali refining of oils and fats" in The Lipid Handbook, Third Edition by Frank D. Gunstone, John L. Harwood, Albert J. Dijkstra; Baley's industrial oil and fat products; Sixth Edition; Volume 5 Edible Oil and Fat Products: Processing Technologies; Chapter 1 A Primer on Oils Processing Technology; section 7. Caustic Refining). The solubilised base content may be increased before step (b), for example to increase the dissociated form and/or polarity of chlorinated precursors of MCPDEs. In one embodiment, the triacylglyceride oil is admixed with water containing a bicarbonate salt or a hydroxide salt, such as sodium bicarbonate or sodium hydroxide.

In another embodiment, the triacylglyceride oil is pre-treated before step (b) with a combination of both acidic and basic water treatment (e.g. as the previously described acidic and basic water treatments).

In one embodiment, the acid/base content of the triacylglyceride oil is adjusted under high-shear mixing.

In one embodiment, the method further comprises one or more of the following steps subsequent to step (c):
(d) one or more processes selected from the group consisting of physical or chemical refining, degumming, neutralization and bleaching;
(e) optionally deodorising the product of step (d), preferably wherein the deodorising is vacuum steam deodorising; and
(f) optionally fractionating the product of step (d) or (e).

In another aspect, the invention provides a triacylglyceride oil obtainable by the method of the invention.

In another aspect, the invention provides use of an auxiliary trapping agent for purification of a triacylglyceride oil, wherein the melting temperatures of the triacylglyceride oil and the auxiliary trapping agent are substantially different, wherein the auxiliary trapping agent is soluble in the triacylglyceride oil, wherein the auxiliary trapping agent is more polar than the triacylglyceride oil, and wherein the purification comprises crystallising the auxiliary trapping agent or the triacylglyceride oil.

In another aspect, the invention provides use of an auxiliary trapping agent for purification of a triacylglyceride oil, wherein the auxiliary trapping agent has a higher melting temperature than the triacylglyceride oil, wherein the auxiliary trapping agent is soluble in the triacylglyceride oil, wherein the auxiliary trapping agent is more polar than the triacylglyceride oil, and wherein the purification comprises crystallising the auxiliary trapping agent.

In another aspect, the invention provides use of an auxiliary trapping agent for purification of a triacylglyceride oil, wherein the triacylglyceride oil has a higher melting temperature than the auxiliary trapping agent, wherein the auxiliary trapping agent is soluble in the triacylglyceride oil, wherein the auxiliary trapping agent is more polar than the triacylglyceride oil, and wherein the purification comprises crystallising the triacylglyceride oil.

In one embodiment, the purification reduces the quantity of chlorinated precursors of monochloropropandiol esters (MCPDEs) in the purified triacylglyceride oil compared to the starting triacylglyceride oil.

DETAILED DESCRIPTION OF THE INVENTION

Figure 1:
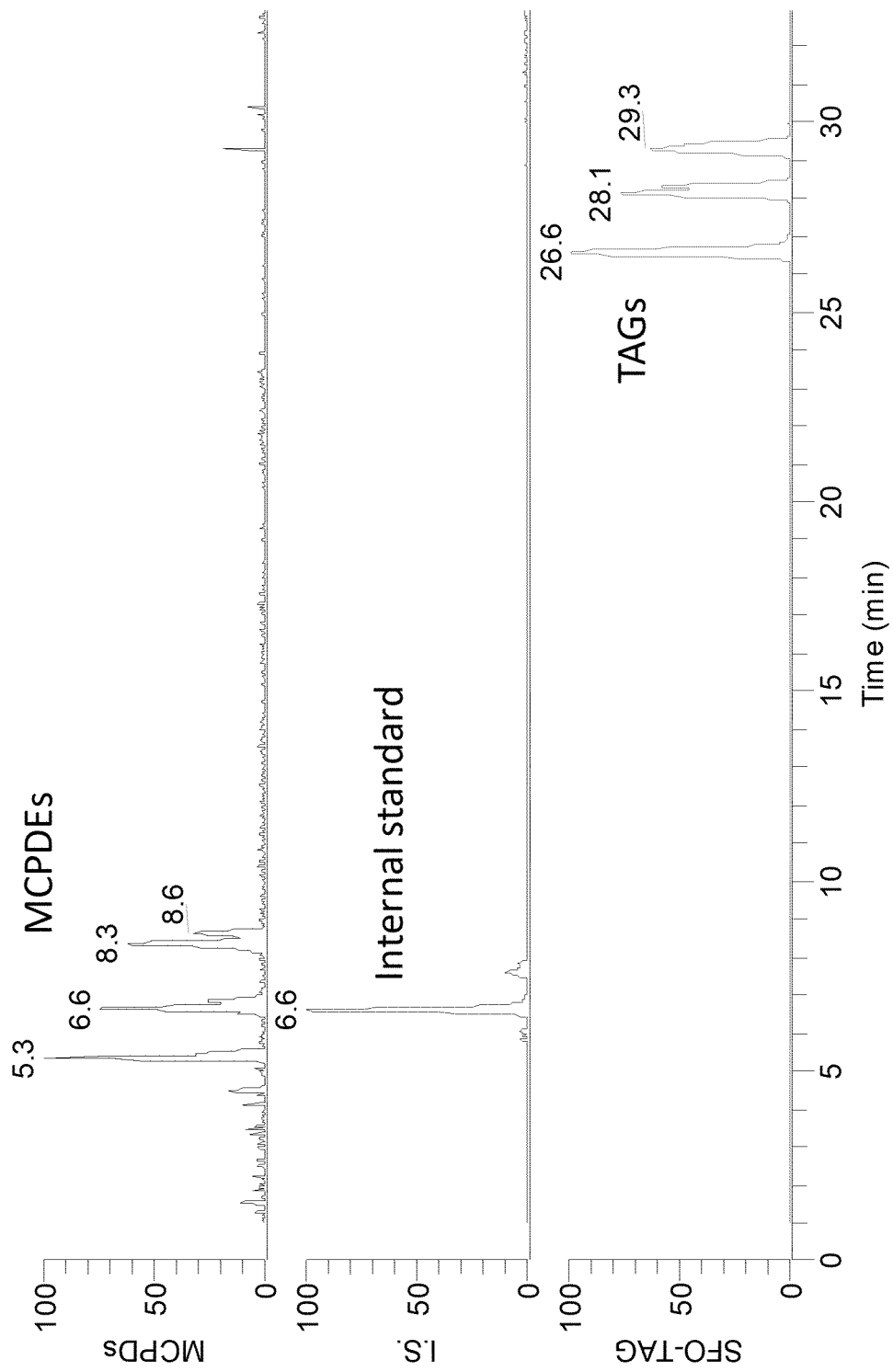
FIG. 1—Example chromatograms of a heat treated crude sunflower oil.

The terms "comprising", "comprises" and "comprised of" as used herein are synonymous with "including" or "includes"; or "containing" or "contains", and are inclusive or open-ended and do not exclude additional, non-recited members, elements or steps. The terms "comprising", "comprises" and "comprised of" also include the term "consisting of".

Purification

In one aspect the invention provides a method for purification of a triacylglyceride oil comprising the steps: (a) admixing the triacylglyceride oil with an auxiliary trapping agent, wherein the melting temperatures of the triacylglyceride oil and the auxiliary trapping agent are substantially different, wherein the auxiliary trapping agent is soluble in the triacylglyceride oil, and wherein the auxiliary trapping agent is more polar than the triacylglyceride oil; (b) (i) crystallising the auxiliary trapping agent by cooling the mixture of step (a) below the melting temperature of the auxiliary trapping agent, wherein the auxiliary trapping agent has a higher melting temperature than the triacylglyceride oil; or (ii) crystallising the triacylglyceride oil by cooling the mixture of step (a) below the melting temperature of the triacylglyceride oil, wherein the triacylglyceride oil has a higher melting temperature than the auxiliary trapping agent; and (c) separating solid and liquid phases of the product of step (b).

The purification is particularly suitable for removing contaminants such as chlorinated precursors of monochloropropandiol esters (MCPDEs) and/or MCPDEs themselves (e.g. chlorinated precursors of 3-monochloropropan-1,2-diol esters (3-MCPDEs) and/or 3-MCPDEs themselves) from a starting triacylglyceride oil (i.e. a triacylglyceride oil immediately before it is subjected to step (a) of the method of the invention).

3-Halogen-1,2-propandiols, in particular 3-monochloro-1,2-propandiol (3-MCPD), are known contaminants in foods (Food Addit. Contam. (2006) 23: 1290-1298). For example, studies have indicated that 3-MCPD may be carcinogenic to rats if administered at high doses (Evaluation of Certain Food Additives and Contaminants, World Health Organisation, Geneva, Switzerland (1993) 267-285; Int. J. Toxicol. (1998) 17: 47). However, it has also been discovered that refined edible oils may contain 3-MCPD in its fatty acid ester form, while only containing very little amounts of free 3-MCPD (Food Addit. Contam. (2006) 23: 1290-1298). The European Food Safety Authority (EFSA) has recommended that 3-MCPD esters are treated as equivalent to free 3-MCPD in terms of toxicity (European Food Safety Authority (2008)).

The method of the invention subjects the starting triacylglyceride oils to treatment with auxiliary agents to trap polar chlorinated substances, which may for example be an active source of chlorine during oil refining, from the starting (e.g. crude) oils. The trapped chlorinated substances may then be physically separated by crystallising either the auxiliary agents from the oil or vice versa. The crystallisation may be assisted through a range of auxiliary agents that can be chosen based on melting point and/or polarity, for example.

It is well known that dehalogenation reactions can occur during thermal processes. For example, chlorine has been shown to leave chemical components as hydrogen chloride (gas) upon the input of sufficient activation energy, which is abundant during the deodorisation of vegetable oils at high temperatures (e.g. up to 270° C.). The inventors believe that hydrogen chloride may be evolved during oil refining from chlorine-containing compounds inherently present in the starting materials of the triacylglyceride oil refining process, for example plant materials.

Indeed, it has been suggested that MCPD generation reactions increase exponentially (>150° C.) and go to completion in a short time period.

Without wishing to be bound by theory, it is suggested that mechanistically, the MCPD di-esters may be formed during oil refinement via the protonation of the terminal ester group of triacylglycerides (TAG), which represent about 88-95% of total glycerides in most vegetable oils, through interaction with hydrogen chloride evolved during oil refining. The formed oxonium cation can then undergo intramolecular rearrangement, followed by nucleophilic substitution of chloride ion and the release of a free fatty acid and an MCPD di-ester.

Once removed through use of the method of the invention, the potential chlorine donors are no longer available for the generation of chlorinated compounds, such as MCPD esters during the heating steps in oil refinement. Product oils low in chlorinated substances are thereby obtained and the purified oils may be subjected to various refining practices, such as heat treatment and deodorisation, in order to produce refined oils low in or free from MCPDEs.

Thus, in one embodiment the quantity of chlorinated precursors of monochloropropandiol esters (MCPDEs) is reduced in the purified triacylglyceride oil compared to the starting triacylglyceride oil.

In another embodiment, the quantity of chlorinated precursors of monochloropropandiol esters (MCPDEs) is reduced in the purified triacylglyceride oil by at least 40%, 50%, 60%, 70%, 80%, 90%, 95%, 96%, 97%, 98% or 99% compared to the starting triacylglyceride oil.

Refined oils produced using the method of the invention may contain, for example, less than 1 ppm, less than 0.5 ppm, or preferably less than 0.3 ppm MCPDEs.

Quantities of MCPDEs and their chlorinated precursors may be readily analysed using protocols well known in the art. For example, liquid chromatography/mass spectrometry (LC/MS)-based approaches are suitable for analysing levels of MCPDEs and their chlorinated precursors, as shown in the present Examples. Example chlorinated precursors of MCPDEs include the known chlorinated precursors with m/z 702.61807; 716.59723; 718.61357; 734.60809; 776.581271 and 804.57813 (Food Additives and Contaminants in Vol. 28, No. 11, November 2011, 1492-1500).

In one embodiment, the triacylglyceride oil input into step (a) of the method of the invention is crude triacylglyceride oil.

The term "crude oil" as used herein may refer to an unrefined oil. For example, in some embodiments, the triacylglyceride oil input into step (a) of the method of the invention has not been refined, degummed, bleached and/or fractionated. In a preferred embodiment, the triacylglyceride oil has not been deodorised before step (a).

In some embodiments, the triacylglyceride oil is subjected to preliminary processing before step (a), such as preliminary cleaning. However, any processes carried out on the triacylglyceride oil before step (a) preferably do not involve heating the triacylglyceride oil, for example to a temperature greater than 150° C., 200° C. or 250° C. In some embodiments, the triacylglyceride oil is subjected to preliminary refining, fractionation, hydrogenation and/or interesterification before step (a).

Triacylglyceride Oil

Oils that may be purified using the method of the invention comprise triacylglycerides and include plant oil, animal oil, fish oil, algal oil and combinations thereof.

In a preferred embodiment, the triacylglyceride oil is a plant oil.

Example, plant oils include sunflower oil, corn oil, canola oil, soybean oil, coconut oil, palm oil, palm kernel oil and cocoa butter.

Auxiliary Trapping Agent

The removal of the chlorinated precursors of monochloropropandiol esters (MCPDEs) and/or MCPDEs themselves is assisted by using a more polar auxiliary lipid trapping agent that facilitates both the solubilisation of the chlorinated precursors and/or MCPDEs, and at the same time the physical separation process (e.g. either by crystallising out from the bulk or remaining a liquid supernatant upon cooling).

The auxiliary trapping agent is selected to have a melting temperature that is substantially different to the melting temperature of the triacylglyceride oil. The difference in melting temperatures facilitates selective crystallisation of either the auxiliary trapping agent or the triacylglyceride oil when a mixture of the two is cooled from a temperature that is greater than the highest melting temperature of both the auxiliary trapping agent and the triacylglyceride oil (i.e. a temperature at which both the auxiliary trapping agent and the triacylglyceride oil are liquid).

The term "melting temperature" as used herein may refer to the temperature at which a solid changes state from solid to liquid at a pressure of 100 kPa. For example, the melting temperature may be the temperature at which a solid changes state from solid to liquid at a pressure of 100 kPa when heated at 2° C. per minute.

The skilled person is readily able to select suitable methods for the determination and comparison of the melting temperatures of the auxiliary trapping agent and the triacylglyceride oil.

For example, apparatus for the analysis of melting temperatures may consist of a heating block or an oil bath with a transparent window (e.g. a Thiele tube) and a magnifier. A sample of the solid may be placed in a thin glass tube and placed in the heating block or immersed in the oil bath, which is then gradually heated. The melting of the solid can be observed and the associated melting temperature noted.

Preferably, the same method is used for the determination of the melting temperatures of the auxiliary trapping agent and the triacylglyceride oil.

When the triacylglyceride oil and/or the auxiliary trapping agent are comprised of more than one component, then:

(a) when the method comprises crystallisation of the auxiliary trapping agent in step (b), the auxiliary trapping agent may be selected such that the lowest melting temperature of the auxiliary trapping agent is greater than the highest melting temperature of the triacylglyceride oil;

(b) when the method comprises crystallisation of the triacylglyceride oil in step (b), the auxiliary trapping agent may be selected such that the highest melting temperature of the auxiliary trapping agent is lower than the lowest melting temperature of the triacylglyceride oil.

The auxiliary trapping agent is selected to be soluble in the triacylglyceride oil (e.g. when both components are above their melting temperatures, mixing of the two gives rise to a substantially single liquid phase. In addition, the auxiliary trapping agent is selected to be more polar than the triacylglyceride oil. The greater polarity of the auxiliary trapping agent may facilitate trapping of chlorinated substances (e.g. chlorinated precursors of MCPDEs, and/or MCPDEs), such that the auxiliary trapping agent sequesters the chlorinated substances from the less polar triacylglyceride oil.

The auxiliary trapping agent may be selected based on its partition coefficient (P), which provides a measure of the solubility of an agent in two immiscible phases (e.g. octanol and water). The partition coefficient is the ratio of concentrations of the agent in a mixture of two immiscible phases at equilibrium, for example:

$$\log P_{oct/wat} = \log\left(\frac{[\text{solute}]_{octanol}}{[\text{solute}]_{water}}\right)$$

The skilled person is readily able to determine log P values of an agent either empirically or based on theoretical approaches known in the art.

In one embodiment, the difference in log $P_{oct/wat}$ between the auxiliary trapping agent and the triacylglyceride oil is at least 1. In a preferred embodiment, the difference in log $P_{oct/wat}$ between the auxiliary trapping agent and the triacylglyceride oil is at least 2.

In one embodiment, the auxiliary trapping agent has a log $P_{oct/wat}$ greater than −0.5. In another embodiment, the auxiliary trapping agent has a log $P_{oct/wat}$ greater than 1, 2, 3, 4 or 5. In a preferred embodiment, the auxiliary trapping agent has a log $P_{oct/wat}$ greater than 5.

Preferably, the auxiliary trapping agent is a food-grade agent. Agents may be considered food grade if they are approved for human or animal consumption.

The auxiliary trapping agent may be a single component or a blend of components, such as monoacylglycerides, diacylglycerides and/or other lipid soluble substances that are more polar than the original primary oil.

Preferably, the auxiliary trapping agent comprises at least one functional group selected from a hydroxyl group and an amide group.

Exemplary auxiliary trapping agents include glycerides, such as monoacylglycerides and diacylglycerides, and free fatty acids. For example, the auxiliary trapping agent may comprise at least one compound selected from the group consisting of monostearin, monopalmitin, distearin, dipalmitin, stearic acid and palmitic acid.

In embodiments wherein the auxiliary trapping agent comprises a glyceride, the mixture of auxiliary trapping agent and contaminant compounds separated by the method of the invention may be subjected to hydrolysis once separated from the triacylglyceride oil. The hydrolysis may liberate the fatty acids from the auxiliary trapping agent glyceride, and the fatty acids may then be separated from the released glycerol and contaminant compounds for further use.

Crystallisation

The term "crystallisation" as used herein may refer to the solidification of the auxiliary trapping agent or the triacylglyceride oil, for example as it is cooled from a temperature at which it is in the liquid state.

The methods of the invention utilise selective crystallisation in which the auxiliary trapping agent or the triacylglyceride oil is crystallised from a mixture of the two. As one of the auxiliary trapping agent or the triacylglyceride oil changes state from a liquid to a solid, but the other component substantially remains in the liquid state, the two may be readily separated based on their different phases. For example, the solid and liquid phases may be separated using centrifugation, decanting and/or filtration. The separation may be most effective when carried out at a temperature in between the melting temperatures of the auxiliary trapping agent and the triacylglyceride oil (i.e. at a temperature at which one component remains substantially liquid and the other component remains substantially solid). Well-known co-crystallisation and/or eutectic effects may be observed in cases where the primary triglyceride is a complex mixture of triacylglycerols or the crystallisation temperature is not well chosen (e.g. too cold). Such co-crystallisation effects may reduce the efficacy of the methods disclosed, but may be prevented by pre-treatment of the triglyceride oil, for example via fractionation processes or using other temperatures for the crystallisation.

Further Refinement

As the chlorine precursors are depleted by the method of the invention, heating during any subsequent refinement processes will not cause significant generation of unwanted chlorinated compounds, such as the MCPDEs.

In one embodiment, the method further comprises one or more processes selected from the group consisting of physical or chemical refining, degumming, neutralization and bleaching subsequent to step (c).

In one embodiment, the method further comprises deodorisation subsequent to step (c), preferably wherein the deodorisation is vacuum steam deodorisation.

In one embodiment, the method further comprises fractionation subsequent to step (c).

Processes for carrying out refinement, degumming, bleaching, deodorisation and fractionation are well known in the art.

By way of example, refinement of plant oil, such as vegetable oil, typically consists of physical refining or chemical refining.

In efforts aimed at increased sustainability, oil refineries have modified their plant oil processing lines in the past few decades for the minimisation of energy expenditure (economisers) and the reduction of waste. However, the steps of these two refining processes have essentially remained the same.

Physical refining is essentially an abridged form of chemical refining and was introduced as the preferred method of palm oil refining in 1973. It may be a three step continuous operation where the incoming oil is pre-treated with acid (degumming), cleansed by being passed through adsorptive bleaching clay, and then subjected to steam distillation. This process allows for the subsequent deacidification, deodorisation and decomposition of carotenoids unique to palm oil (i.e. the crude oil is deep red in colour, unlike other vegetable oils). Given the lack of neutralisation step in physical refining, refined bleached (RB) oil produced from a physical refinery contains nearly the same free fatty acid (FFA) levels as found in the crude oil.

Neutralised bleached (NB) oil from a chemical refinery and RB palm oil are comparable pre-deodorisation in every other aspect.

The heat bleaching unit operation is the main source of loss in the oil refining process resulting in 20-40% reduction in oil volume post filtration. The process typically lasts for about 30-45 min and typically takes place under 27-33 mbar vacuum at a temperature of 95-110° C.

Heat bleached oil may then be rerouted in piping to a deaerator that aides in the removal of dissolved gases, as well as moisture, before being sent to a deodorisation tower.

A bleaching step may comprise heating the oil and cleaning the oil by passing it through adsorptive bleaching clay.

A deodorisation step may comprise steam distillation.

The skilled person will understand that they can combine all features of the invention disclosed herein without departing from the scope of the invention as disclosed.

Preferred features and embodiments of the invention will now be described by way of non-limiting examples.

The practice of the present invention will employ, unless otherwise indicated, conventional techniques of chemistry, biochemistry, molecular biology, microbiology and immunology, which are within the capabilities of a person of ordinary skill in the art. Such techniques are explained in the literature. See, for example, Sambrook, J., Fritsch, E. F. and Maniatis, T. (1989) Molecular Cloning: A Laboratory Manual, 2nd Edition, Cold Spring Harbor Laboratory Press; Ausubel, F. M. et al. (1995 and periodic supplements) Current Protocols in Molecular Biology, Ch. 9, 13 and 16, John Wiley & Sons; Roe, B., Crabtree, J. and Kahn, A. (1996) DNA Isolation and Sequencing: Essential Techniques, John Wiley & Sons; Polak, J. M. and McGee, J. O'D. (1990) In Situ Hybridization: Principles and Practice, Oxford University Press; Gait, M. J. (1984) Oligonucleotide Synthesis: A Practical Approach, IRL Press; and Lilley, D. M. and Dahlberg, J. E. (1992) Methods in Enzymology: DNA Structures Part A: Synthesis and Physical Analysis of DNA, Academic Press. Each of these general texts is herein incorporated by reference.

EXAMPLES

Example 1

Materials and Methods

Production of Crude Palm Oil 1.8 kg frozen, whole, intact palm fruit was thawed at room temperature. The kernels were removed from the fruit manually using a scalpel. 4 L of extraction solution was prepared by mixing 2 L of 2-propanol and 2 L of n-hexane. 1.4 kg of palm pulp including the fruit flesh and skin was mixed, pureed and homogenised with 2 L of extraction solution using a commercial immersion blender mixer (Bamix Gastro 200). The resulting slurry was mixed and further homogenised with the remaining 2 L of extraction solution using a polytron (Kinematica Polytron PT 10 35 GT). The resulting slurry solution was aliquoted into 1 L polypropylene tubes (Sorvall 1000 mL) and centrifuged at 4000 g for 15 min at 30° C. in a Thermo Scientific Heraeus Cryofuge 8500i centrifuge. The organic phases were filtered through filter paper (Whatman 595 1/2) and were combined. The organic solvent was then evaporated from the oil using a Büchi Rotavapor R-300 system at 60° C. (B-300 heating bath, I-300 vacuum controller, V-300 pump and P-314 recirculating chiller operated at 4° C.). The vacuum was stepwise adjusted until it reached 10 mbar to avoid boiling of the sample.

Production of Crude Palm Olein

Crude palm oil was left at room temperature for 8 h. The solid and liquid phases were then separated by centrifugation at 10000 g at 23° C. for 60 min. The resulting liquid phase was labelled as crude palm olein.

Production of Crude Sunflower Seed Oil 1.2 kg of sunflower seeds were crushed and homogenised with 1.5 L of extraction solution (2-propanol:n-hexane, 1:1 v/v) using a commercial immersion blender mixer (Bamix Gastro 200). The homogenate was mixed with a further 1.5 L of extraction solution and further homogenised using a polytron (Kinematica Polytron PT 10 35 GT). The resulting slurry was aliquoted into 1 L polypropylene tubes (Sorvall 1000 mL) and centrifuged at 4000 g for 15 min at 22° C. in a Thermo Scientific Heraeus Cryofuge 8500i centrifuge. The organic phases were filtered through filter paper (Whatman 595 1/2) and were combined. The organic solvent was then evaporated from the oil using a Büchi Rotavapor R-300 system at 60° C. (B-300 heating bath, I-300 vacuum controller, V-300 pump and P-314 recirculating chiller operated at 4° C.). The vacuum was stepwise adjusted until it reached 10 mbar to avoid boiling of the sample.

Auxiliary Trapping Agents

MonoStearin-Based Mixture of Monoacylglycerols

MonoStearin-based mixture of monoacylglycerols was from Dimodan® HS K-A, which is composed of distilled monoglycerides made from edible, fully hydrogenated soybean oil.

MonoPalmitin/MonoOlein-Based Mixture of Monoacylglycerols

MonoPalmitin/MonoOlein-based mixture of monoacylglycerols was from Dimodan® P-T K-A, which is comprised of distilled monoglycerides made from edible, refined palm oil.

Mitigation Trials

Treatment of Crude Palm Oil with a MonoStearin-Based Mixture of Monoacylglycerols as the Auxiliary Trapping Agent 5% w/w of commercially available monostearin (Dimodan HS K-A from Danisco) was added to the crude oil. The mixture was heated to 80° C. to allow complete melting. The sample was then incubated for 7 h at 40° C. The crystallised solid and liquid phases were separated by centrifugation at 10000 g for 20 min at 40° C. yielding about 85% liquid phase.

Treatment of Crude Palm Olein with a MonoStearin-Based Mixture of Monoacylglycerols as the Auxiliary Trapping Agent 5% w/w of commercially available MonoStearin-based mixture monoacylglycerols (Dimodan HS K-A from Danisco) was added to the crude oil. The mixture was heated to 80° C. to allow complete melting. The sample was then incubated for 7 h at room temperature. The crystallised solid and liquid phases were separated by centrifugation at 10000 g for 20 min at room temperature yielding about 40% liquid phase.

Treatment of Crude Sunflower Oil with a MonoStearin-Based Mixture of Monoacylglycerols as the Auxiliary Trapping Agent 5% w/w of commercially available monostearin-based mixture of monoacylglycerols (Dimodan HS K-A from Danisco) was added to the crude oil. The mixture was heated to 80° C. to allow complete melting. The sample was then incubated for 7 h at room temperature. The crystallised solid and liquid phases were separated by centrifugation at 10000 g for 20 min at room temperature yielding about 50% liquid phase.

Treatment of Crude Sunflower Oil with a MonoPalmitin/MonoOlein-Based Mixture of Monoacylglycerols as the Auxiliary Trapping Agent 5% w/w of commercially available monopalmitin/monoolein (Dimodan P-T K-A from Danisco) was added to the crude oil. The mixture was heated to 80° C. to allow complete melting. The sample was then incubated for 7 h at room temperature. The crystallised solid and liquid phases were separated by centrifugation at 10000 g for 20 min at room temperature yielding about 50% liquid phase.

In-Ampoule Heat Treatment of Samples

The heat treatment of crude oil samples was performed in sealed glass ampoules under nitrogen for 2 h at 230° C. in a Thermo Scientific Heraeus oven (serie 6100). The glass ampoules were fabricated from glass Pasteur pipettes by flushing them with nitrogen and sealing them using a Bunsen gas burner. These conditions were chosen in order to mimic the thermal conditions used during edible-oil deodorisation.

Liquid Chromatography—Mass Spectrometry Analysis

Sample Preparation

Oils and home-produced crude oils were diluted stepwise prior to injection. Firstly, 50 µL of each sample was transferred into a vial and 950 µL of a mixture of n-Hexane:Acetone (1:1 v/v) was added. The sample was vortexed for 5-10 s. In the second step, this solution was further diluted by mixing a 100 µL aliquot and with 900 µL of acetone. The obtained solution was vortexed for 5-10 s. The final dilution step consisted of mixing the following:

10 µL solution obtained after the second dilution step;
5 µL of a 0.2 ng/µL internal standard solution (1-oleoyl 2-inoleoyl 3-chloropropanediol-$^2H_5$); and
85 µL of a mixture of Acetone:Methanol (1:1 v/v)

LC Conditions

Ultra high performance liquid chromatography was performed using a ThermoFisher Accela system equipped with a silica based octadecyl phase (Waters Acquity HSS C18, 1.7 µm; 2.1×150 mm). The applied solvent gradient is summarised in Table 1.

TABLE 1

Details of the applied LC gradient (solvent A was 1 mM ammonium-formate in methanol; and solvent B was 100 µM ammonium-formate in isopropanol).

| Time [min] | Solvent A [%] | Solvent B [%] | Flow rate [µL/min] |
|---|---|---|---|
| 0 | 100 | 0 | 400 |
| 15.0 | 100 | 0 | 300 |
| 18.0 | 50 | 50 | 200 |
| 25.0 | 0 | 100 | 200 |
| 32.5 | 0 | 100 | 180 |
| 33.0 | 0 | 100 | 150 |
| 35.0 | 100 | 0 | 150 |
| 40.0 | 100 | 0 | 400 |
| 42.0 | 100 | 0 | 400 |

MS Conditions

Monitoring of monochloropropandiol (MCPD) esters and their organic precursors was performed using a Thermo Fisher Q-Exactive hybrid mass spectrometer. This platform enabled analysis at about 70000 mass resolution and a routine mass accuracy of 2 ppm. The precursors of MCPD esters were detected in negative ion mode electrospray ionisation (ESI$^-$), while MCPD esters were monitored in ESI positive ion mode (ESI). Under these conditions the observed MCPD precursor ion was [M−H]$^-$, whereas the monitored MCPD ester ions were the [M+NH$_4$]$^+$ adducts. For data interpretation the m/z signals were extracted in a 10 ppm window.

Results

Crude Sunflower Oil

Figure 2:
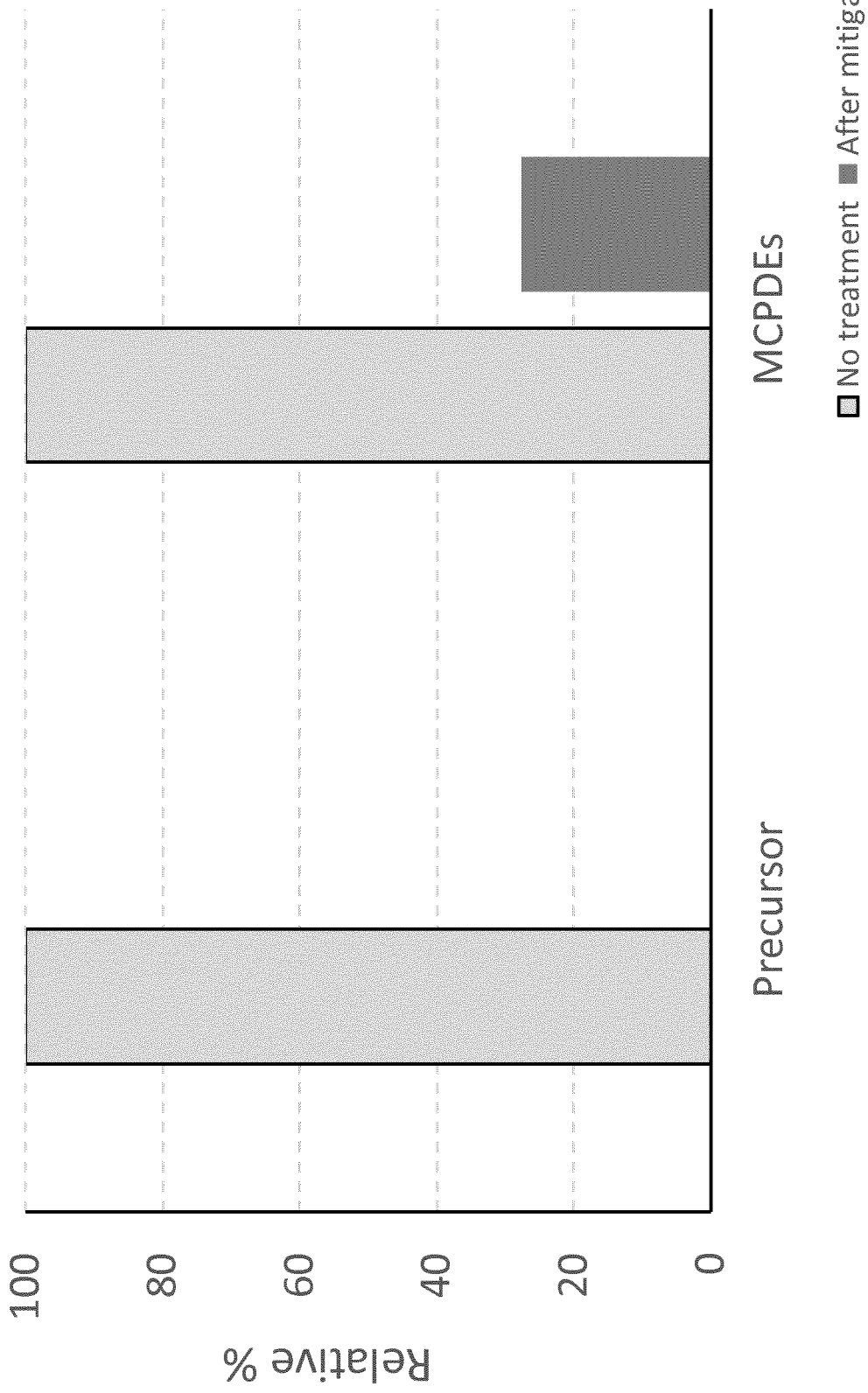
FIG. 2—Removal of chlorinated precursor m/z 718 (as identified in Food Additives and Contaminants in Vol. 28, No. 11, November 2011, 1492-1500) from crude sunflower oil and its benefit in return on the monochloropropandiol ester (MCPDE) levels as observed in the heated oil.

The crystallisation assisted removal of chlorinated precursors was applied to crude sunflower oil, as described above. The auxiliary trapping agent was a monostearin. The signals of a known chlorinated precursor with m/z 718.61357 were monitored as described above. The obtained peak areas without any treatment (starting material) and after the mitigation are shown in FIG. 2.

Crude Palm Oil

Figure 3:
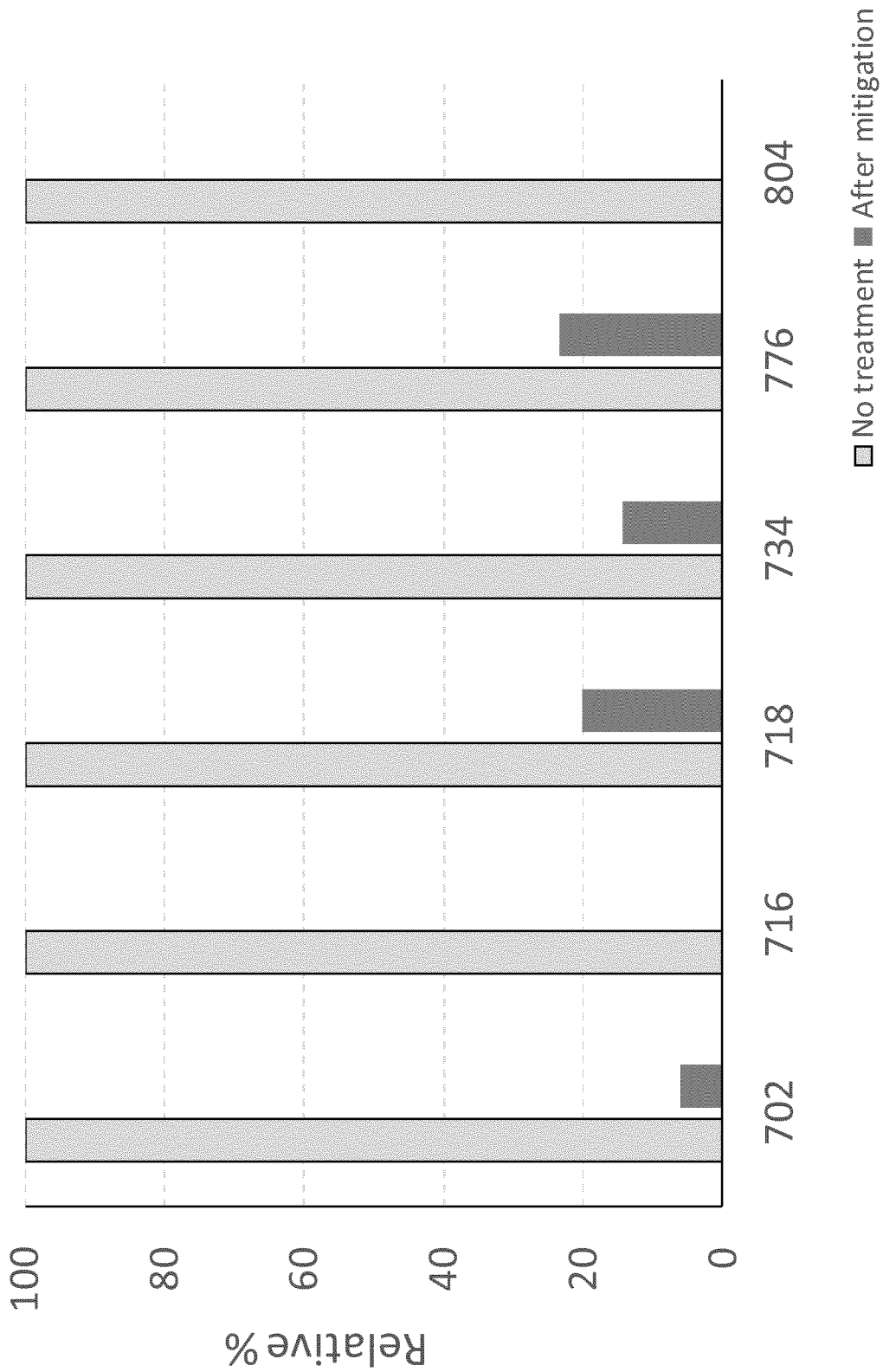
FIG. 3—Removal of chlorinated precursors m/z 702.61807; 716.59723; 718.61357; 734.60809; 776.581271 and 804.57813 (Food Additives and Contaminants in Vol. 28, No. 11, November 2011, 1492-1500) from crude palm oil.

The crystallisation assisted removal of chlorinated precursors was applied to crude palm oil, as described above. The auxiliary trapping agent was a monostearin. The signals of known chlorinated precursors were monitored at m/z 702.61807; 716.59723; 718.61357; 734.60809; 776.581271 and 804.57813 (Food Additives and Contaminants in Vol. 28, No. 11, November 2011, 1492-1500) as described above. The obtained peak areas without any treatment (starting material) and after the mitigation are shown in FIG. 3.

Crude Palm Oil Olein

Figure 4:
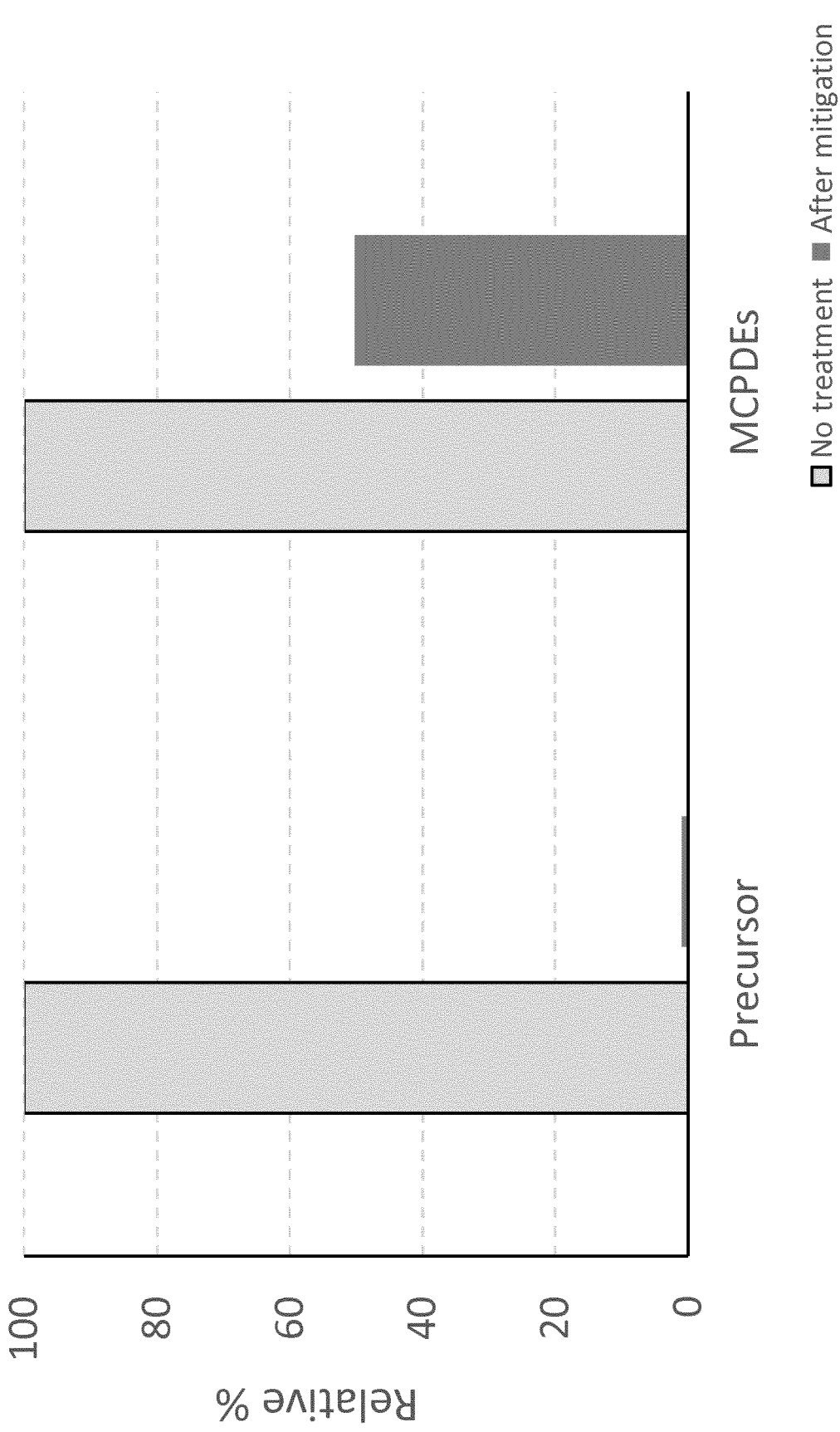
FIG. 4—Removal of chlorinated precursor m/z 718 from crude palm oil olein and its benefit in return on the monochloropropandiol ester (MCPDE) levels as observed in the heated oil.

The crystallisation assisted removal of chlorinated precursors was applied to crude palm olein, as described above. The auxiliary trapping agent was a monostearin. The signals of a known chlorinated precursor with m/z 718.61357 were monitored as described above. The obtained peak areas without any treatment (starting material) and after the mitigation are depicted in FIG. 4.

Discussion

The data show substantial reduction in the levels of both chlorinated precursors and monochloropropandiol esters (MCPDEs) after the mitigation compared to the levels observed in the absence of treatment for each of the studies on crude sunflower oil, crude palm oil and crude palm olein.

Example 2

Chemicals

Monopalmitin (M-154-JY20-B) was purchased from Nu-Check Prep Inc., Minnesota, USA. The stable isotope labelled internal standard rac-1-oleoyl-2-linoleoyl-3-chloropropanediol-d5 (CAS no. n.a.) was purchased from Campro Scientific (Berlin, Germany).

Sodium acetate and solvents for LC-MS (water, methanol, isopropanol, acetone, n-hexane) were all LC-MS grade and purchased from Sigma-Aldrich (Buchs, Switzerland).

Distilled monoacylglycerols including the monostearin-based Dimodan® HS K-A, the monopalmitin/olein/linolein-based Dimodan® P-T K-A and monoolein based Dimodan® MO 90/D were from Danisco Cultor (Switzerland) AG (Kreuzlingen).

Abbreviations used: P—palmitic; O—oleic; L—linoleic.

Vegetable Oil Samples

Production of Crude Palm Oil 1.8 kg frozen, whole, intact palm fruit was thawed at room temperature. The kernels were removed from the fruit manually using a scalpel. 4 L of extraction solution was prepared by mixing 2 L of 2-propanol and 2 L of n-hexane. 1.4 kg of palm pulp including the fruit flesh and skin was mixed, pureed and homogenised with 2 L of extraction solution using a commercial immersion blender mixer (Bamix Gastro 200). The resulting slurry was mixed and further homogenised with the remaining 2 L of extraction solution using a polytron (Kinematica Polytron PT 10 35 GT). The resulting slurry solution was aliquoted into 1 L polypropylene tubes (Sorvall 1000 mL) and centrifuged at 4000 g for 15 min at 30° C. in a Thermo Scientific Heraeus Cryofuge 8500i centrifuge. The organic phases were filtered through filter paper (Whatman 595 1/2) and combined. The organic solvent was then evaporated from the oil using a Büchi Rotavapor R-300 system at 60° C. (B-300 heating bath, I-300 vacuum controller, V-300 pump and P-314 recirculating chiller operated at 4° C.). The vacuum was stepwise adjusted until it reached 10 mbar to avoid boiling of the sample.

Production of Crude Sunflower Seed Oil 1.2 kg of sunflower seeds were crushed and homogenised with 1.5 L of extraction solution (2-propanol:n-hexane, 1:1 v/v) using a commercial immersion blender mixer (Bamix Gastro 200). The homogenate was mixed with a further 1.5 L of extraction solution and further homogenised using a polytron (Kinematica Polytron PT 10 35 GT). The resulting slurry was aliquoted into 1 L polypropylene tubes (Sorvall 1000 mL) and centrifuged at 4000 g for 15 min at 22° C. in a Thermo Scientific Heraeus Cryofuge 8500i centrifuge. The organic phases were filtered through filter paper (Whatman 595 1/2) and were combined. The organic solvent was then evaporated from the oil using a Büchi Rotavapor R-300 system at 60° C. (B-300 heating bath, I-300 vacuum controller, V-300 pump and P-314 recirculating chiller operated at 4° C.). The vacuum was stepwise adjusted until it reached 10 mbar to avoid boiling of the sample.

Sunflower Model System Enriched with Precursors

Fully refined sunflower oil enriched with precursors was used in order to allow study of the concept in a simplified system that will not crystallize and this way will not interfere with the effect of the trapping agent. For this purpose crude palm oil and fully refined sunflower oil (available from the supermarket) were heated to 60° C. and mixed in a ratio of 6:4 v/v. The mixture was let crystallize at room temperature for 24 h. Then the solid and liquid phases were separated by centrifugation at 15000 g at 23° C. for 15 min. The resulting liquid phase was labeled as "sunflower model system".

Industrially Produced Crude Soybean and Corn Oil

Industrially produced soybean and corn crude oils were selected for the purpose of this study and were purchased from VFI GmbH, Wels, Austria. Soybean was a "bio" variant, while corn was a conventional corn oil.

Mitigation Trials to Deplete Organochlorines

5% w/w of trapping agent was added to the oil. The mixture was heated to 80° C. to allow complete melting. The sample was then shaken vigorously and incubated for 7 h at room temperature. During this latter period the high melting point trapping agent crystallized and initiated the formation a solid phase, while majority of the oil bulk remained liquid. These two phases did not separate spontaneously, but formed a gel-like bulk. The crystallized solid and liquid phases were separated by centrifugation at 15000 g for 15 min.

Figure 5:
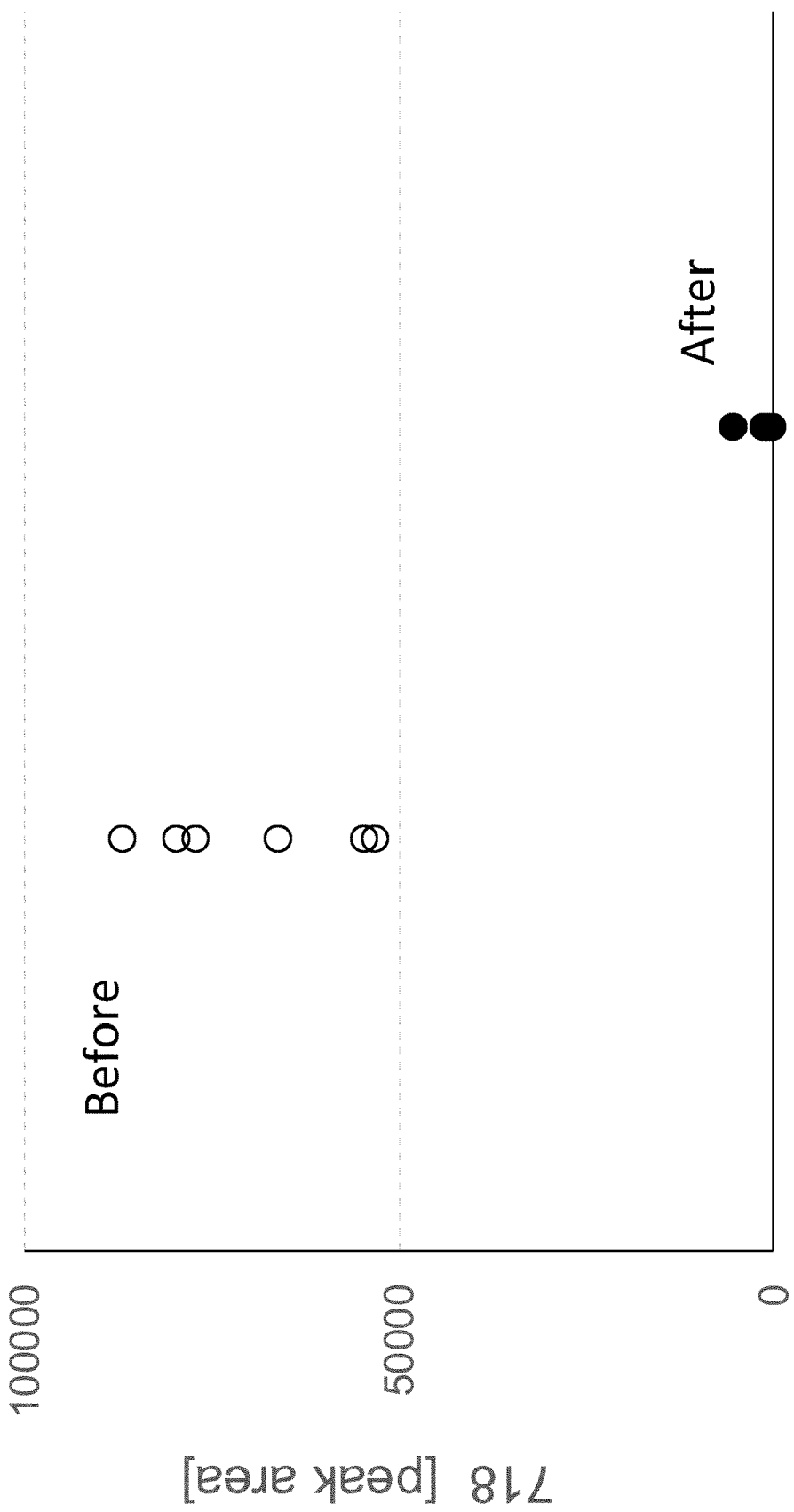
FIG. 5—Repeatability of trapping the chlorinated precursor (n=6) m/z 718 from the model system Spiked sunflower oil.

The repeatability of experiments was studied in the model system of spiked sunflower oil by using the monostearin as trapping agent. The experiment was conducted six times in parallel using the same starting material. The signal of chlorinated precursor with m/z 718.61357 was monitored in the samples containing the monostearin but analyzed immediately without any phase separation (before trapping) and in the cooled samples where the crystallized solid has been removed by centrifugation. The obtained absolute peak areas are shown in FIG. 5.

Heat Treatment of Samples

The heat treatment of oil samples was performed in sealed glass ampoules under nitrogen for 2 h at 230° C. in a Thermo Scientific Heraeus oven (serie 6100). The glass ampoules were fabricated from glass Pasteur pipettes by flushing them with nitrogen and sealing them using a Bunsen gas burner. These conditions were chosen in order to mimic the thermal conditions used during edible-oil deodorisation.

Figure 6:
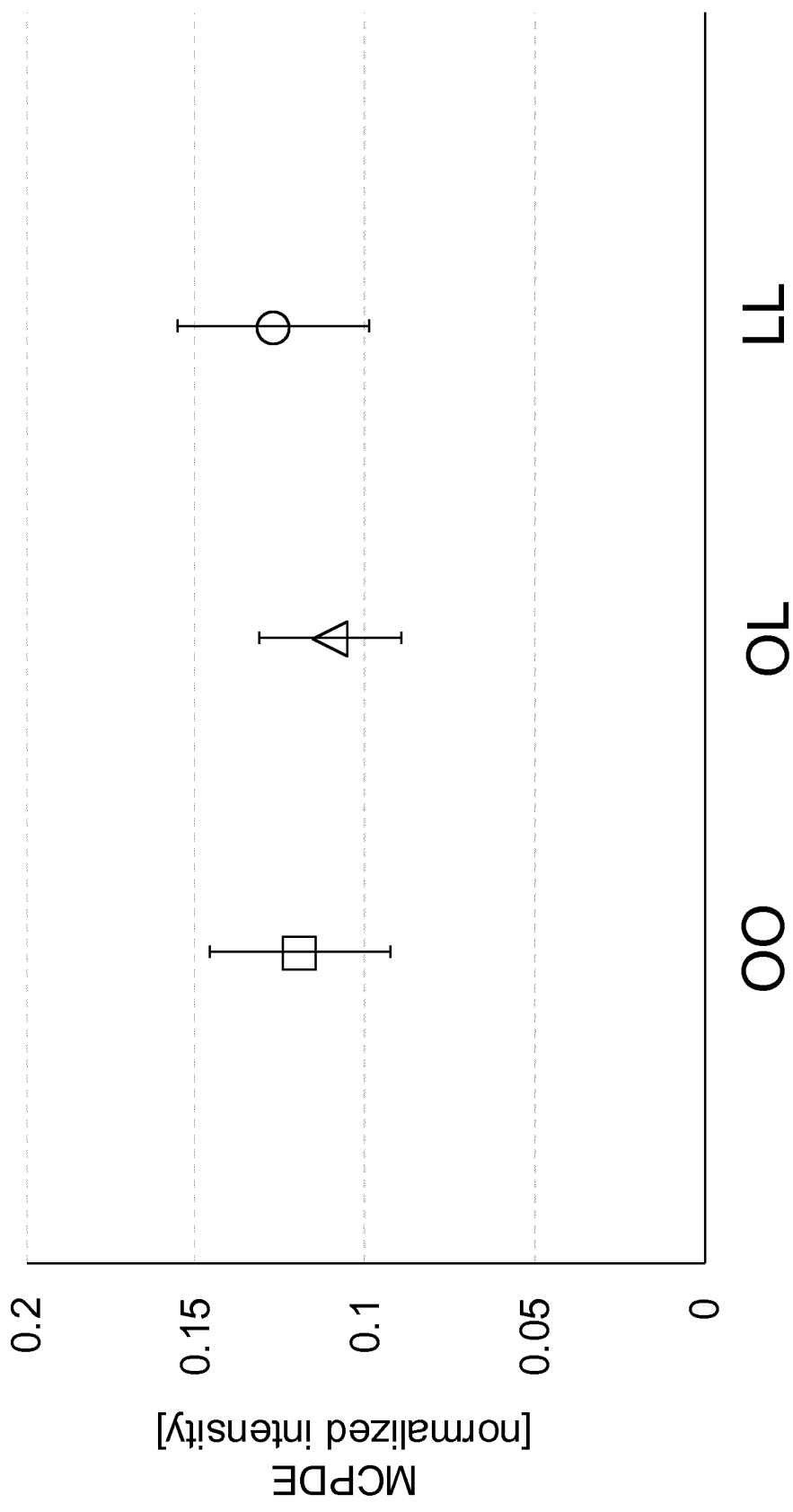
FIG. 6—Repeatability of heating crude sunflower oil in glass ampoules (n=10). Error bars represent standard deviation.

The repeatability of heat treatment was studied in crude sunflower oil. The experiment was conducted ten times in parallel using the same starting material. The signal of OO (dioleyl-), OL (oleyl-linoleyl-) and LL (dilinolenyl-) MCPDEs were monitored as described above. The obtained peak areas normalized to the signals of internal standard $^2H_5$-OL-MCPDE are shown in FIG. 6.

Sample Preparation for LC-MS Analysis

Samples were melted in 80° C. water bath, then 100 μL was diluted with 900 μL acetone/n-hexane 1:1. This solution was then further diluted 20 times with acetone and then again diluted 2 times with methanol containing the internal standard (rac-1-Linoleoyl-2-stearoyl-3-chloropropanediol-d5) at 50 ng/mL. This way the final sample concentration in the vial was 250 μg/mL.

LC Conditions

Ultra high performance liquid chromatography was performed using a Dionex Ultima 3000 system equipped with a silica based octadecyl phase (Waters Acquity HSS C18, 1.7 μm; 2.1×150 mm). The applied solvent gradient is summarised in Table 2.

TABLE 2

Details of the applied LC gradient (solvent A was 1 mM ammonium-formate in methanol; and solvent B was 100 μM ammonium-formate in isopropanol).

| Time [min] | Solvent A [%] | Solvent B [%] | Flow rate [μL/min] |
|---|---|---|---|
| 0 | 100 | 0 | 400 |
| 15.0 | 100 | 0 | 300 |
| 18.0 | 50 | 50 | 200 |
| 25.0 | 0 | 100 | 200 |
| 32.5 | 0 | 100 | 180 |
| 33.0 | 0 | 100 | 150 |
| 35.0 | 100 | 0 | 150 |
| 40.0 | 100 | 0 | 400 |
| 42.0 | 100 | 0 | 400 |

MS Conditions

Monitoring of MCPDEs and their organic precursors was performed using a Thermo Fisher Lumos and Elite hybrid mass spectrometer. This platform enabled analysis at about 240000 mass resolution and a routine mass accuracy of 1 ppm. The precursors of MCPDEs were detected in negative ion mode electrospray ionisation (ESI$^-$), while MCPDEs were monitored in ESI positive ion mode (ESI$^+$). Under these conditions the observed MCPDE precursor ion was [M−H]$^-$, whereas the monitored MCPD ester ions were the [M+H]$^+$, [M+NH$_4$]$^+$ and the [M+Na]$^+$ adducts. For data interpretation the m/z signals were extracted in a 10 ppm window.

Figure 7:
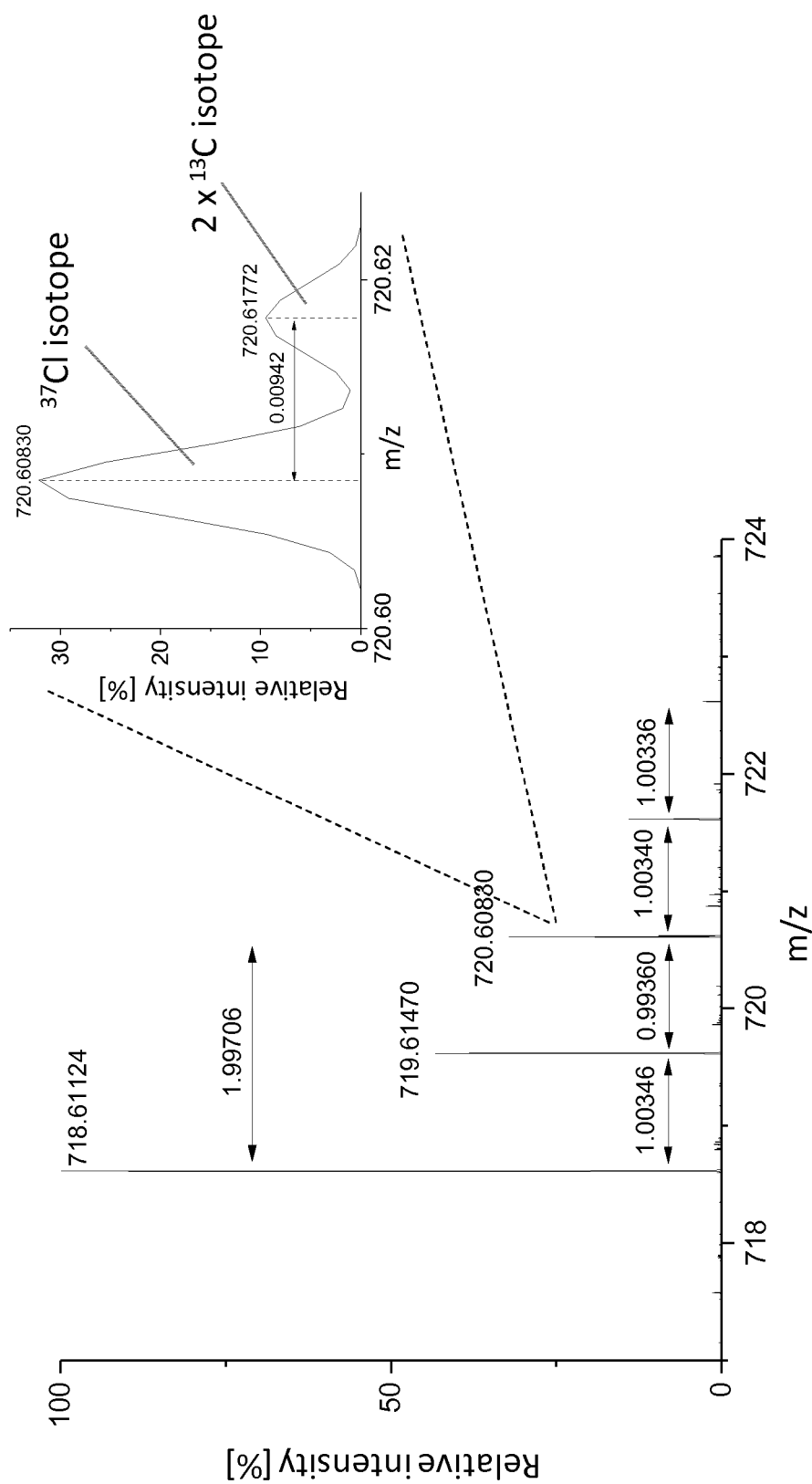
FIG. 7—Example negative ion mode ESI-MS mass spectrum of the most abundant chlorinated precursor with m/z 718.61124.

An example mass spectrum of the most abundant chlorinated precursor observed at m/z 718.61124 is shown in FIG. 7. The insert depicts the magnified second isotope cluster. In this cluster, the first peak representing the $^{37}Cl$ isotope can be used together with its negative mass defect as a marker for the efficient screening of chlorinated substances.

Results & Discussion
Proof-of-Concept in the Sunflower Model System

In the first phase of the study, the concept of chlorinated precursor trapping was tested in a simple model system, where commercially available fully refined sunflower oil was used as a model matrix spiked with organochlorines coming from crude palm oil, as described in section "Sunflower model system enriched with precursors". Fully refined sunflower oil was chosen as a starting model system since this oil is easy to access and is liquid at room temperature. To ensure strong analytical signals for the precursors, it was decided to spike this oil with commonly occurring organochlorines that are particularly abundant in palm oil. This allows an effective demonstration of the concept and easier confirmation of an effect that can be then further optimized in real life industrial oils (see sections further below).

Figure 8:
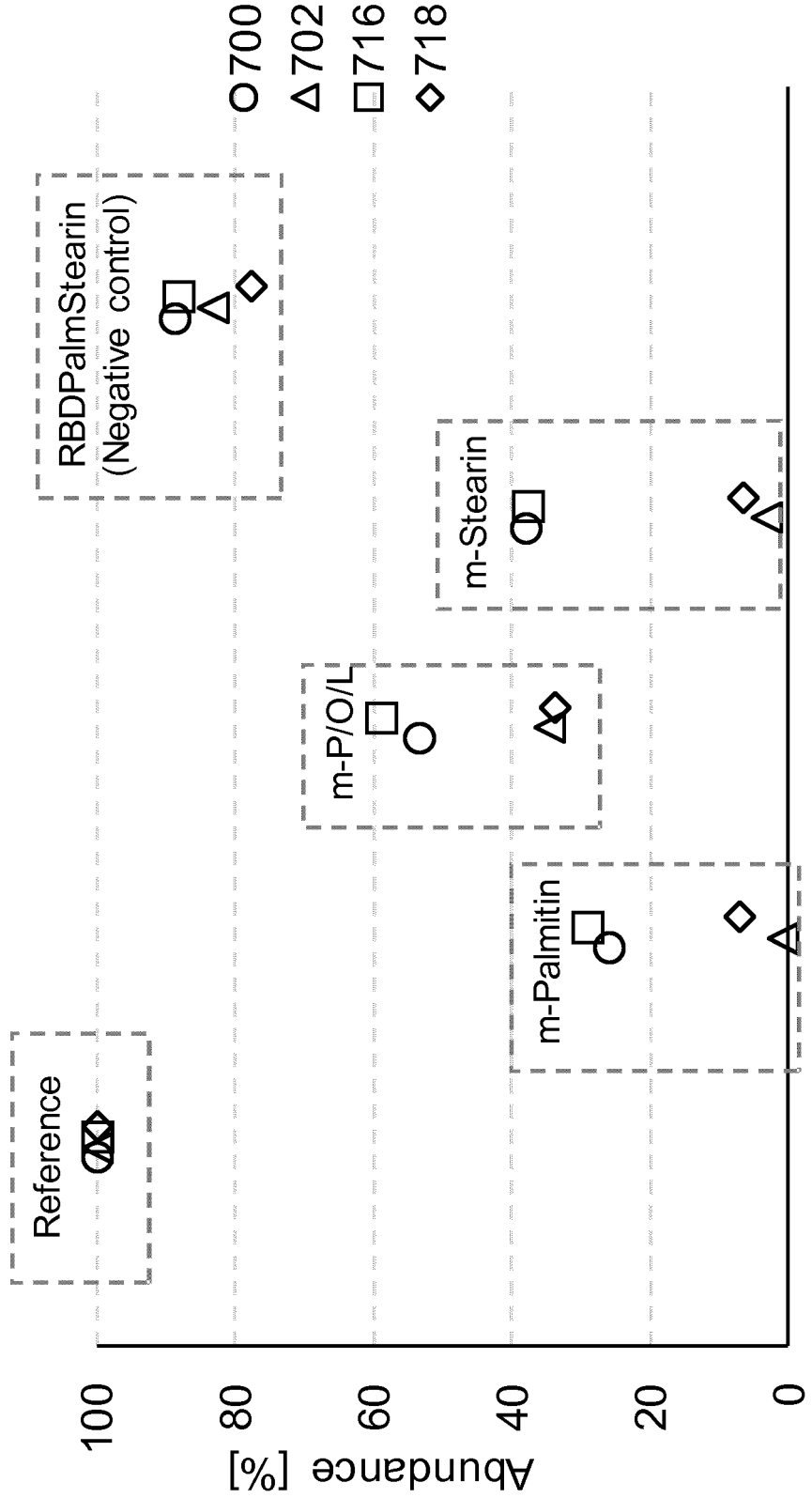
FIG. 8—Relative abundance of the four main chlorinated precursors in the liquid phase of trapping experiments conducted in the model sunflower oil.

The trapping was performed with 1) mP, chemical grade, pure monopalmitin, 2) m-P/O/L: industrial grade distilled monoglycerol mixture based on monopalmitin/-olein/-linolein and 3) mSt, industrial grade distilled monostearin. The fully refined palm stearin (RBD Palm stearin) was the negative control (free of monoacylglycerols but high melting point). The signals of the four main previously reported chlorinated precursors with m/z 700.60280; 702.61807; 716.59723 and 718.61357 were monitored as described above. The obtained peak areas in starting material samples (without any treatment) and in the liquid phases of the trapping experiments are depicted in FIG. 8.

The results show that solidified monoglycerols can remove about 60-95% of the four main chlorinated precursors from the liquid phase. The complete solidification of the monoacylglycerol is essential to achieve efficient trapping, as this is illustrated by monopalmitin/olein/linolein mixture where the removal process is less efficient showing only 40-60% reduction. This latter is explained by the very slow and/or incomplete solidification process, since the melting point of monoolein is 35° C. and the melting point of monolinolein is 12° C. (Hudson 1993). The example of RBD Palm stearin is shown as a negative control. In this latter case, the trapping agent is practically free of monoglycerols and the solid phase is primarily solidified triacylglycerols. In accordance with the presented trapping approach, the RBD palm stearin does not remove efficiently the investigated chlorinated precursors (10-20%).

Figure 9:
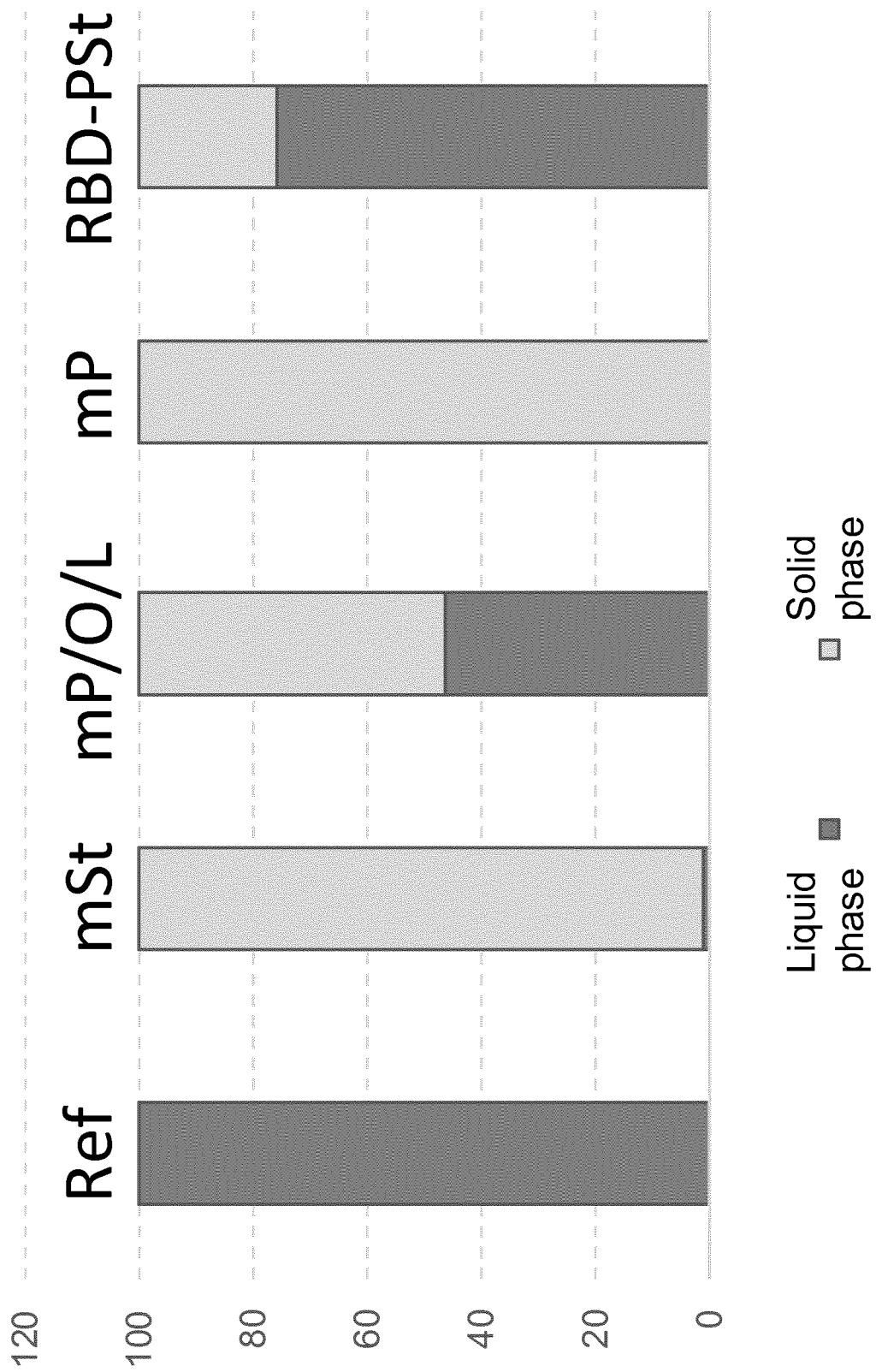
FIG. 9—Balance of the four main chlorinated precursors between the liquid and solid phase of trapping experiments conducted in the model system of spiked sunflower oil.

In a complementary way, it was possible to analyze also the solid phase of the experiments in order to confirm that the reduction of organochlorines in the liquid phase can be "recovered" in the solid phase of the same experiments. The trapping was performed with 1) chemical grade, pure monopalmitin, 2) industrial grade distilled monoglycerol mixture based on monopalmitin/-olein/-linolein and 3) industrial grade distilled monostearin. The refined palm stearin was the negative control (free of monoacylglycerols but high melting point). The corresponding results are shown in FIG. 9 depicting the balance of organochlorines between the solid and liquid phases. These results confirm that the investigated organochlorines are enriched in the solidified monoglycerides, e.g. monostearin and monopalmitin but not at all in the solidified triacylglycerol RBD palm stearin (negative control).

Time Course Experiment of the Trapping

Figure 10:
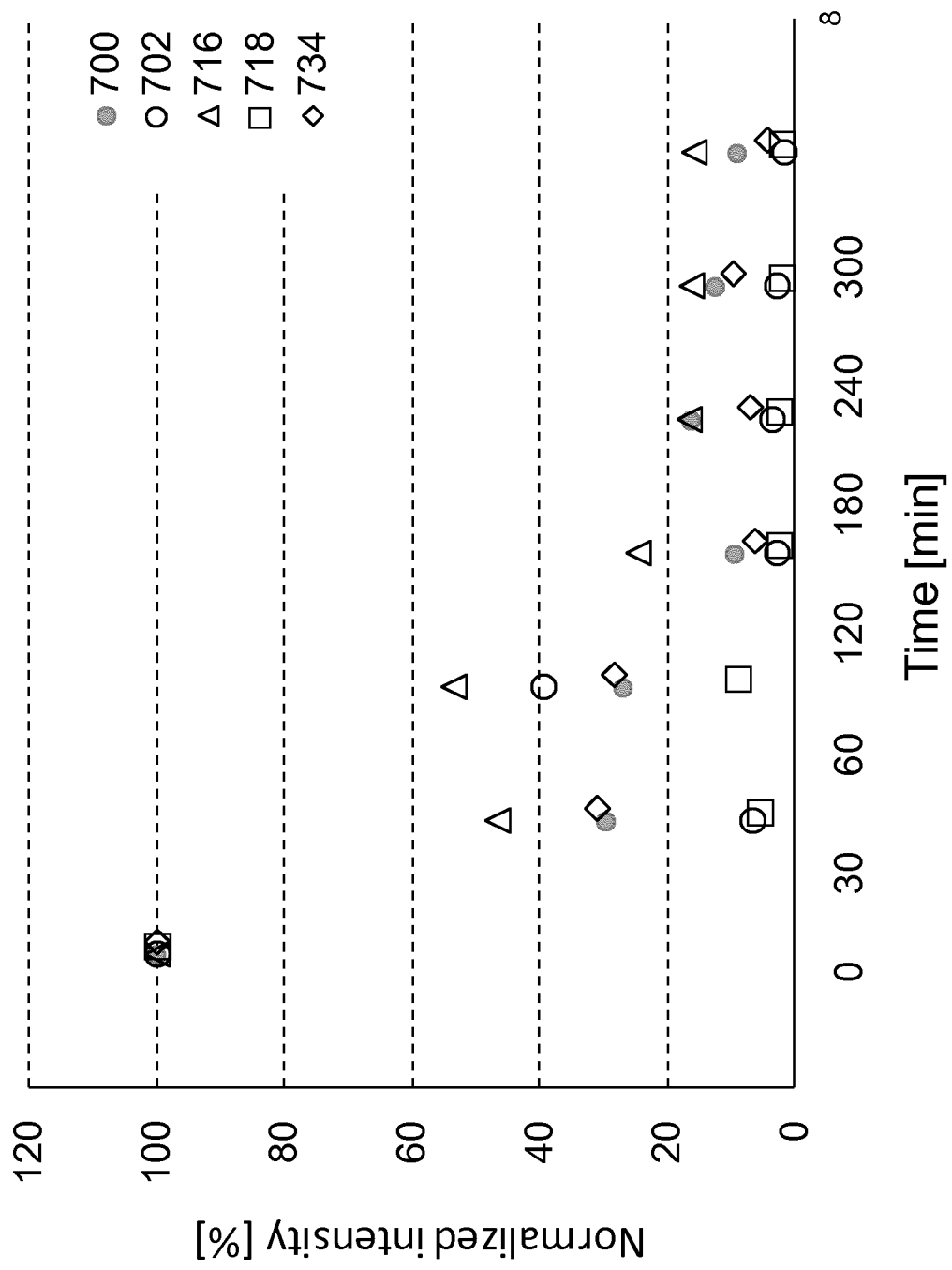
FIG. 10—The dynamics of organochlorine trapping is shown in the model sunflower oil enriched in the precursors. The abundances of organochlorines remaining in the liquid phase are plotted in function of trapping time. The peak areas are normalized to the peak areas observed at t0 (samples already containing the 5% monostearin, but not centrifuged, rather immediately diluted for analysis).

The dynamics of the chlorinated precursor trapping was studied by varying the equilibration time elapsed between the addition of the trapping agent and its separation from the liquid oil phase. In every case, the monostearin was homogenized with the sample at 80° C. and then was let equilibrated at room temperature. Monostearin was used as a trapping agent. The removal of the organochlorines was monitored by LC-MS. The obtained peak areas in starting material samples (without any treatment) and in the liquid phases of the trapping experiments are depicted in FIG. 10.

Mitigation in Crude Solvent Extracted Sunflower Oil

Figure 11:
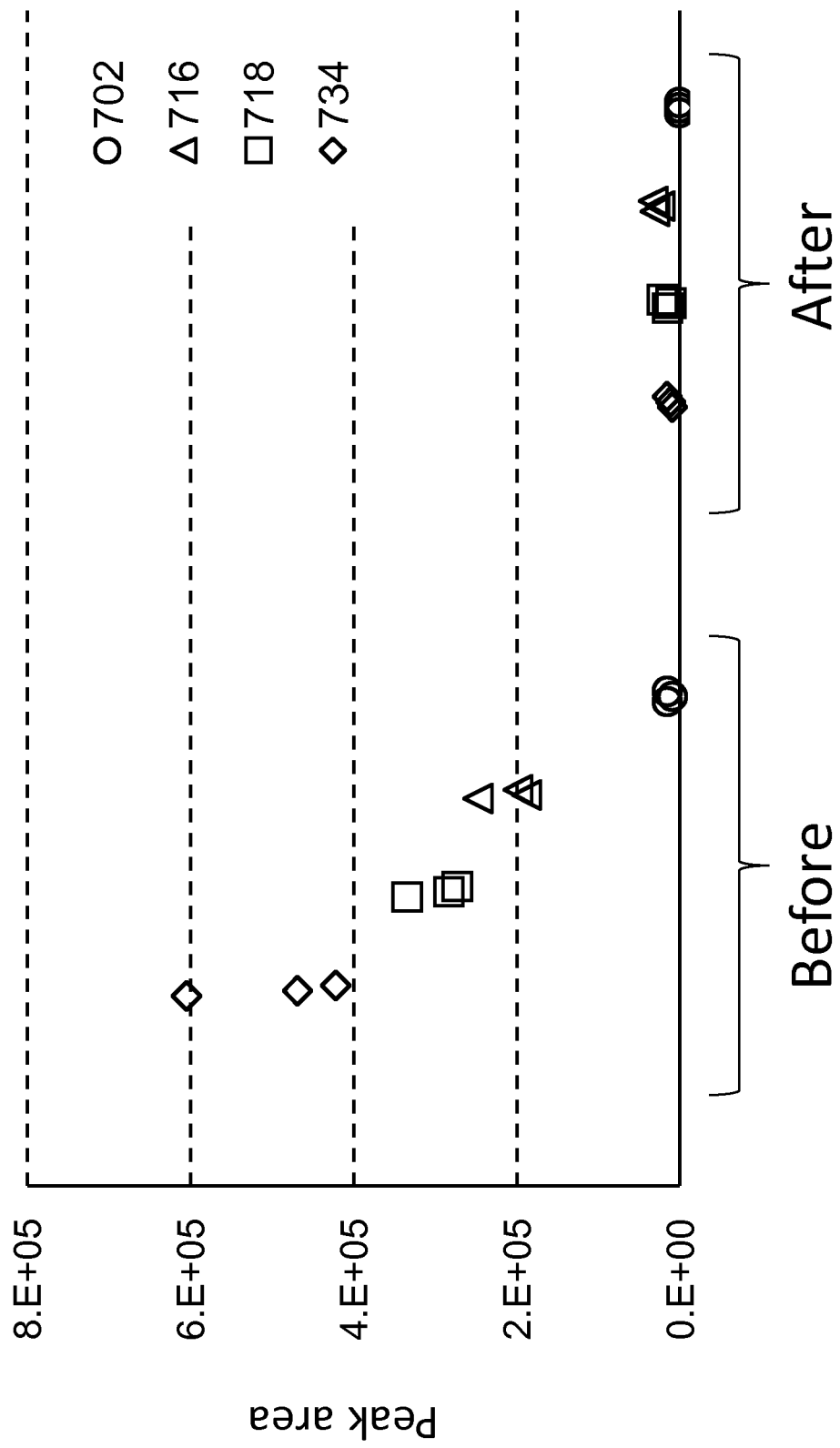
FIG. 11—Removal of chlorinated precursors with the trapping concept from crude sunflower oil. (n=3)
Figure 12:
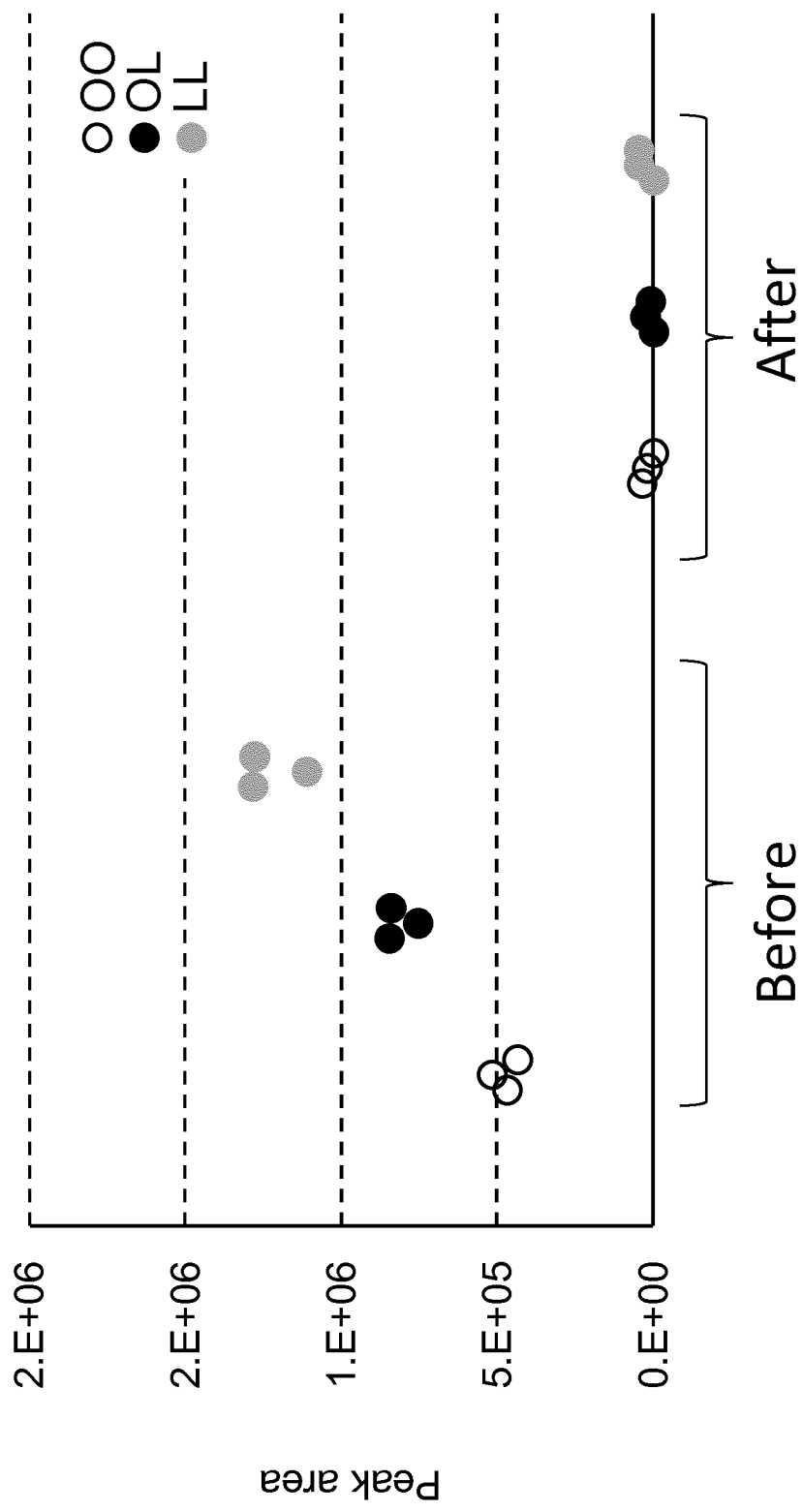
FIG. 12—MCPDEs observed in the heated crude sunflower oil before and after removing the organochlorines. (n=3)

The concept of chlorinated precursor trapping was applied to crude sunflower oil, as described above. The trapping agent was a monostearin. The experiments were performed in triplicates on the same starting material. The signals of chlorinated precursors with m/z 702.61807; 716.59723; 718.61360 and 734.60809 were monitored as described above. The obtained peak areas without any treatment (starting reference material) and after the mitigation are shown in FIG. 11. The same samples were also subjected to heat treatment and analyzed for the MCPDE content as described above. The beneficial effect of the trapping concept is depicted in FIG. 12 by depicting absolute peak areas of MCPDEs before and after the mitigation.

All four precursor signals drastically decreased after trapping. The highest mitigation efficacy was observed on m/z 734.60809 in crude sunflower oil reaching about 99%.

Mitigation in Crude Soybean Oil

Figure 13:
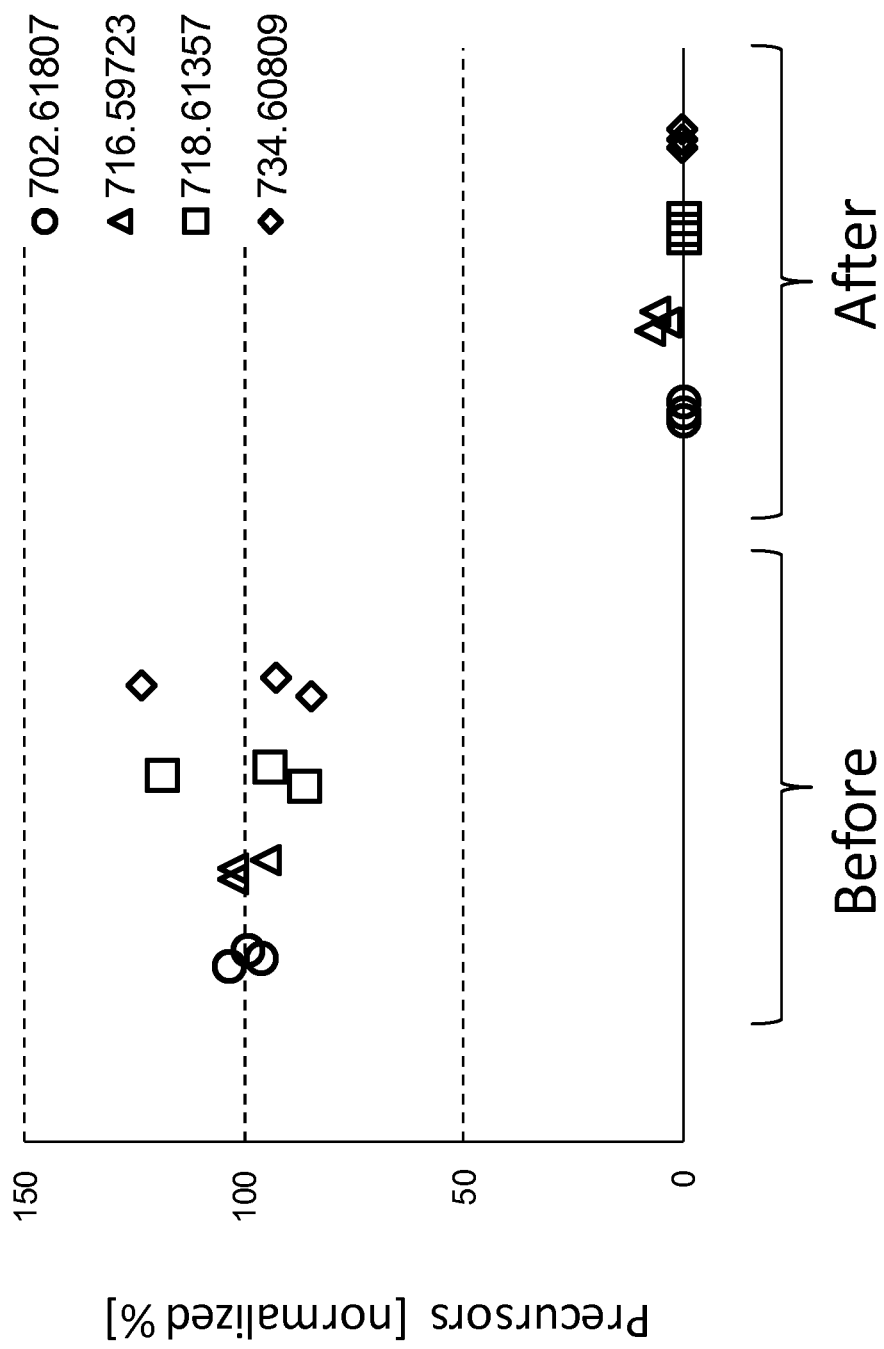
FIG. 13—Removal of chlorinated precursors with the trapping concept from crude soybean oil. (n=3)

The concept of chlorinated precursor trapping was applied to crude bio-grade soybean oil, as described above. The trapping agent was a monostearin. The signals of chlorinated precursors with m/z 702.61807; 716.59723; 718.61360 and 734.60809 were monitored as described above. The obtained peak areas without any treatment (starting reference material) and after the mitigation are shown in FIG. 13.

Figure 14:
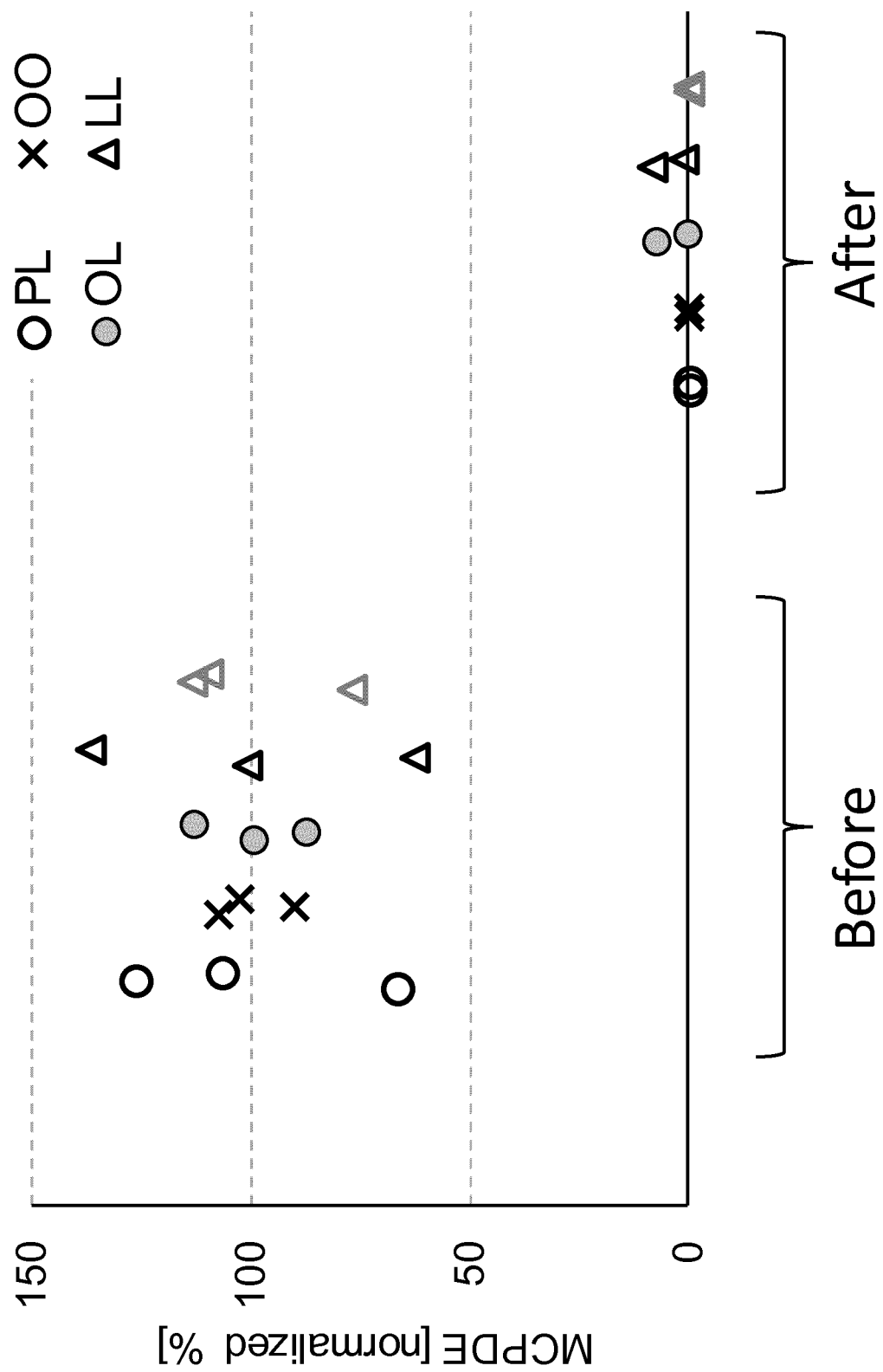
FIG. 14—MCPDEs observed in the heated crude soybean oil before and after removing the organochlorines. (n=3)

The same samples were also subjected to heat treatment and analyzed for the MCPDE content as described above. The beneficial effect of the trapping concept is depicted in FIG. 14 by depicting absolute peak areas of MCPDEs before and after the mitigation.

Mitigation in Crude Corn Oil

Figure 15:
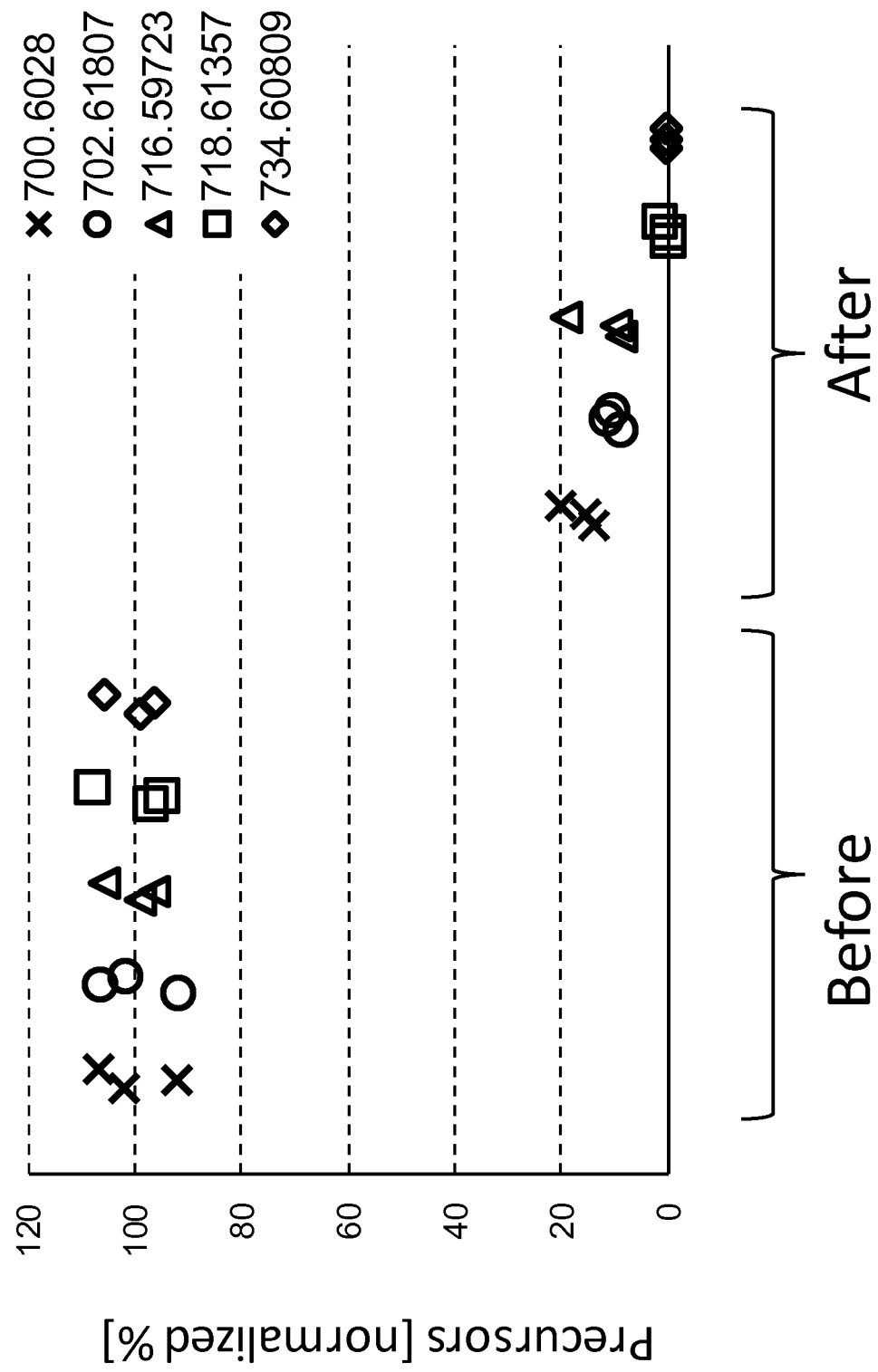
FIG. 15—Removal of chlorinated precursors with the trapping concept from crude corn oil. (n=3)

The concept of chlorinated precursor trapping was applied to crude corn oil, as described above. The trapping agent was a monostearin. The signals of chlorinated precursors with m/z 702.61807; 716.59723; 718.61360 and 734.60809 were monitored as described above. The obtained peak areas without any treatment (starting reference material) and after the mitigation are shown in FIG. 15.

Figure 16:
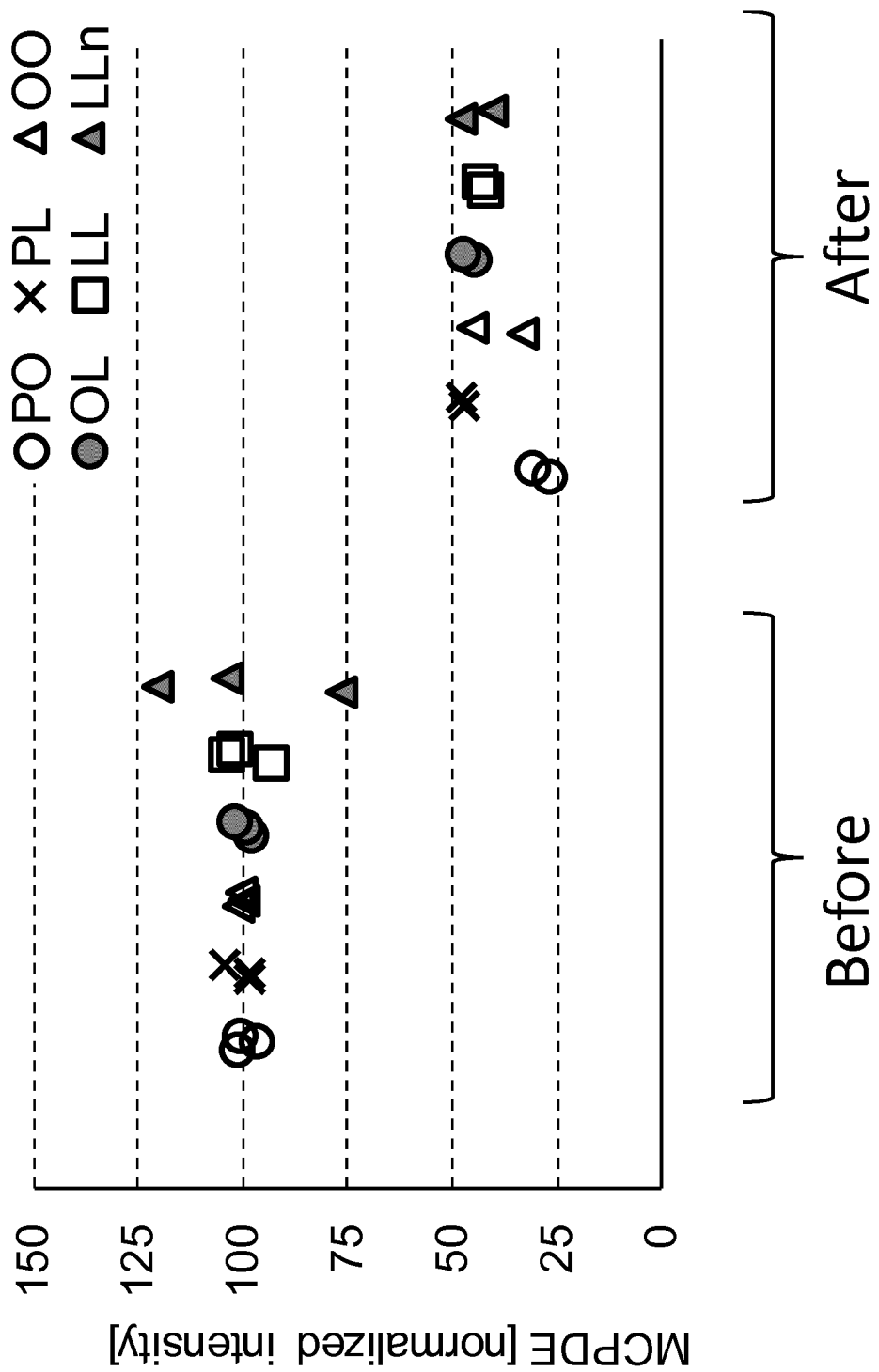
FIG. 16—MCPDEs observed in the heated crude corn oil before and after removing the organochlorines. (n=3)

The same samples were also subjected to heat treatment and analyzed for the MCPDE content as described above. The beneficial effect of the trapping concept is depicted in FIG. 16 by depicting absolute peak areas of MCPDEs before and after the mitigation.

This example demonstrates a proof-of-concept that allows trapping and removal of certain organochlorines from vegetable oils. In this process the organochlorines are separated from the oil bulk due to their better solubility in the trapping agent. The approach is based on a mixing/separation process that does not require the use of any solvent and thus has potential for scale-up and industrialization. The concept is demonstrated with various trapping agents on simple model system of refined sunflower oil. Application cases are shown for solvent extracted crude sunflower oil, industrially produced crude soybean and corn oil.

These lab-scale results suggest that early, solvent-free removal of certain organochlorines from the vegetable oils is possible and this brings beneficial effect on the ultimately formed MCPDE content of the oils. While in real life industrial processes the formation of MCPDEs can occur from very diverse chlorine sources depending on the type, quality and production history of the oil, the herein described approach might represent a new, additional step forward on the way to further minimizing the formation of MCPDEs in the ultimately consumed, fully refined vegetable oil.

Example 3

The information provided in this example is relevant for Examples 4 to 11 which follow.

Chemicals

Water was of MilliQ grade. BioUltra Phosphoric acid was from Sigma Alrich (79617-250 ML). Sodium hydroxide (pellets) was from Merck (1.06498.1000).

Sample Analysis

Sample Preparation

Oil samples were diluted stepwise prior to injection.
1) Firstly, 100 μL of each sample was transferred into a vial and 900 μL of a mixture of n-Hexane:Acetone (1:1 v/v) was added. The sample was vortexed for 5-10 s.
2) In the second step, 50 μL of this solution was further diluted by mixing it with 950 μL of acetone. The obtained solution was vortexed for 5-10 s.
3) 100 μL of this latter solution was mixed with 90 μL of methanol and 10 μL of internal standard mix solution. (the internal standard mix solution contained at 2 ng/μL concentration the following stable isotope labeled compounds solubilized in methanol: 1-oleoyl 2-inoleoyl 3-chloropropanediol-$^2H_5$ (OL), 1-2-dipalmitooyl 3-chloropropanediol-$^2H_5$ (PP), 1-palmitoyl 2-oleoyl 3-chloropropanediol-$^2H_5$ (PO), 1-palmitoyl 2-linoleoyl 3-chloropropanediol-$^2H_5$ (PL), 1-2-dilinoleoyl 3-chloropropanediol-$^2H_5$, (LL),), 1-2-oleoyl 3-chloropropanediol-$^2H_5$, (OO)).

LC Conditions

Ultra high performance liquid chromatography was performed using either a Thermo UltiMate 3000 system or a Waters Acquity H-class system equipped with a silica based octadecyl phase (Waters Acquity HSS C18, 1.7 μm; 2.1×150 mm). The applied solvent gradient is summarised in Table 3.

TABLE 3

Details of the applied LC gradient (solvent A was 1 mM ammonium-formate in methanol; and solvent B was 100 μM ammonium-formate in isopropanol).

| Time [min] | Solvent A [%] | Solvent B [%] | Flow rate [μL/min] |
| --- | --- | --- | --- |
| 0 | 100 | 0 | 400 |
| 15.0 | 100 | 0 | 300 |
| 18.0 | 50 | 50 | 200 |
| 25.0 | 0 | 100 | 200 |
| 32.5 | 0 | 100 | 180 |
| 33.0 | 0 | 100 | 150 |
| 35.0 | 100 | 0 | 150 |
| 40.0 | 100 | 0 | 400 |
| 42.0 | 100 | 0 | 400 |

MS Conditions

Monitoring of monochloropropandiol (MCPD) esters and their organic precursors was performed using Thermo Fisher high resolution mass spectrometers (Q Exactive Hybrid Quadrupole-Orbitrap, Orbitrap Fusion™ Lumos™ Tribrid™ and Orbitrap Elite Hybrid). These platforms enabled highly selective mass analysis at a routine mass accuracy of ~2 ppm. The precursors of MCPD esters were detected in negative ion mode electrospray ionisation (ESI⁻), while MCPD esters were monitored in ESI positive ion mode (ESI). Under these conditions the observed MCPD precursor ion was [M−H]⁻, whereas the monitored MCPD ester ions were the [M+NH$_4$]⁺ and [M+Na]⁺ adducts.

Data Interpretation

The relative quantification of precursors was performed by first extracting the ion chromatograms of the respective substances at their respective m/z value in a 10 ppm mass window and then integrating the resulting peak areas at the corresponding chromatographic retention time. The m/z and chromatographic retention time values of each precursor analyte are shown in Table 4.

For every experiment in Examples 4 to 11, the peak areas detected in the control samples were set as 100% and the results found in the mitigated samples were expressed as a relative % compared to the non-mitigated control samples.

TABLE 4

| Monitored ion [m/z] | Retention time [min] |
| --- | --- |
| 700.60161 (700a) | 10.0 |
| 700.60161 (700b) | 10.9 |
| 704.59575 (704) | 6.5 |
| 716.59607 (716a) | 6.2 |
| 716.59607 (716b) | 8.0 |
| 718.61161 (718a) | 6.6 |
| 718.61161 (718b) | 7.5 |
| 732.62744 (732) | 8.7 |
| 734.60709 (734) | 5.7 |
| 746.64296 (746a) | 8.8 |
| 746.64325 (746b) | 10.1 |

The relative quantification of MCPDE was performed by first extracting the ion chromatograms of the [M+NH$_4$]⁺ and [M+Na]⁺ adducts at their respective m/z value in a 10 ppm mass window and then integrating the resulting peak areas at the corresponding chromatographic retention time. The abbreviations of the monitored MPCDEs are as follows: PP: dipalmitoyl MCPD ester; PO: palmitoyl-oleyl MCPD ester; OC: dioleyl MCPD ester; OL: oleyl-linoleyl MPCD ester; LL: dilinoleyl MPCD ester; PL: palmitoyl-linoleyl MPCD ester.

For every experiment in Examples 4 to 11, the peak areas of the most abundant MPCDEs detected in the control samples were set as 100% and the results found in the mitigated samples were expressed as a relative % compared to the non-mitigated control samples.

Example 4

Industrially Produced Crude Palm Oil

Industrially produced crude palm oil was purchased from Nutriswiss (Lyss, Switzerland). The crude oil was first heated at 80° C. and then centrifuged at 15,000 g for 15 min at 40° C. The upper 90 v/v % liquid phase was immediately separated from the sediment and further used for mitigation trials.

Figure 17:
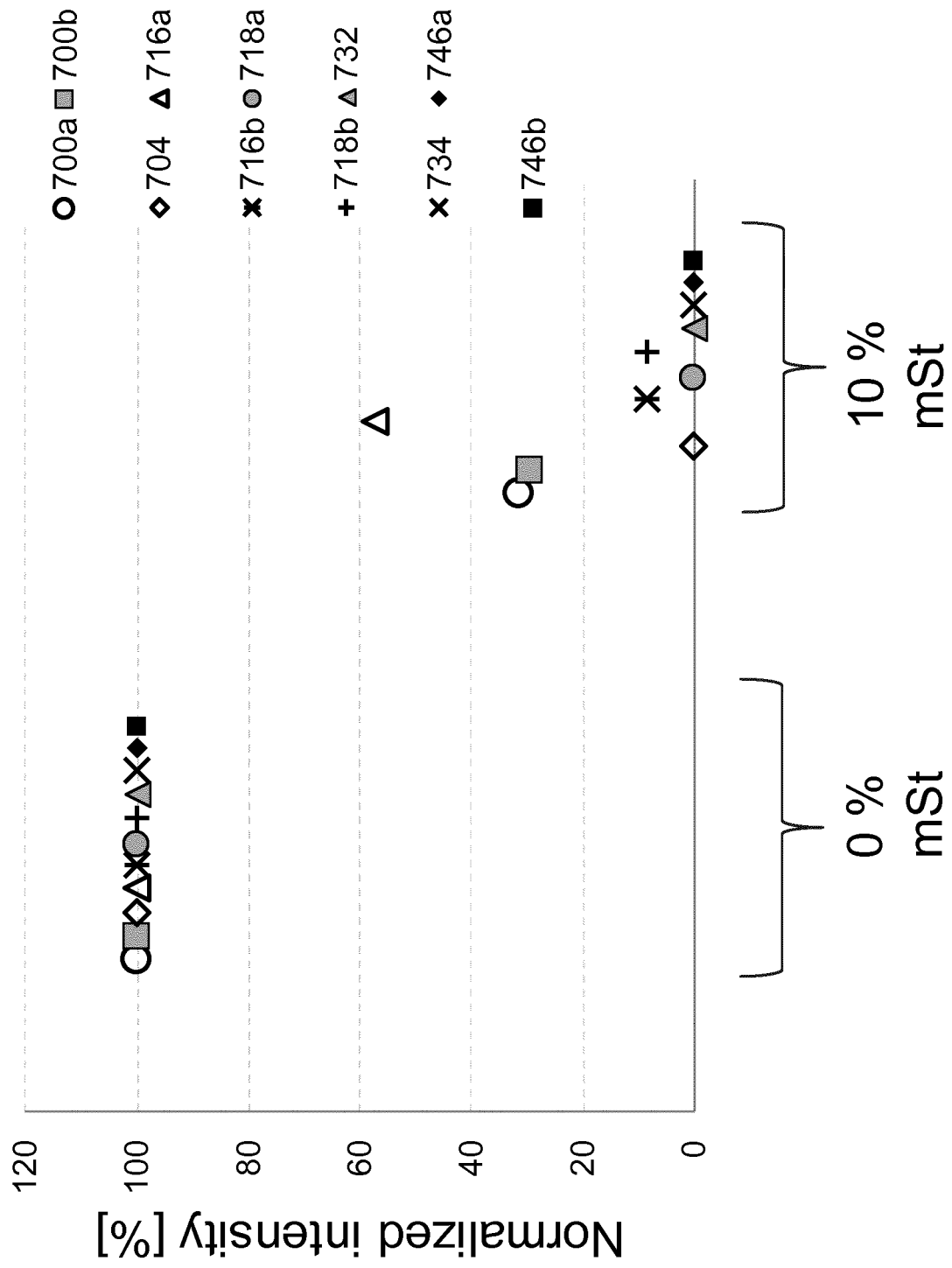
FIG. 17—Removal of chlorinated precursors with the trapping concept from industrially produced crude palm oil.

Mitigation was performed by adding 10% w/w of commercially available monostearin (Dimodan HS K-A from Danisco) to the oil. The mixture was heated to 80° C. to allow complete melting. The sample was then incubated for 16 h at 40° C. The crystallized solid and liquid phases were separated by centrifugation at 10,000 g for 20 min at 40° C. The resulting samples were analysed by LC-MS as described above in Example 3 for their precursor content. The effect of mitigation on the precursor levels is shown in FIG. 17.

Figure 18:
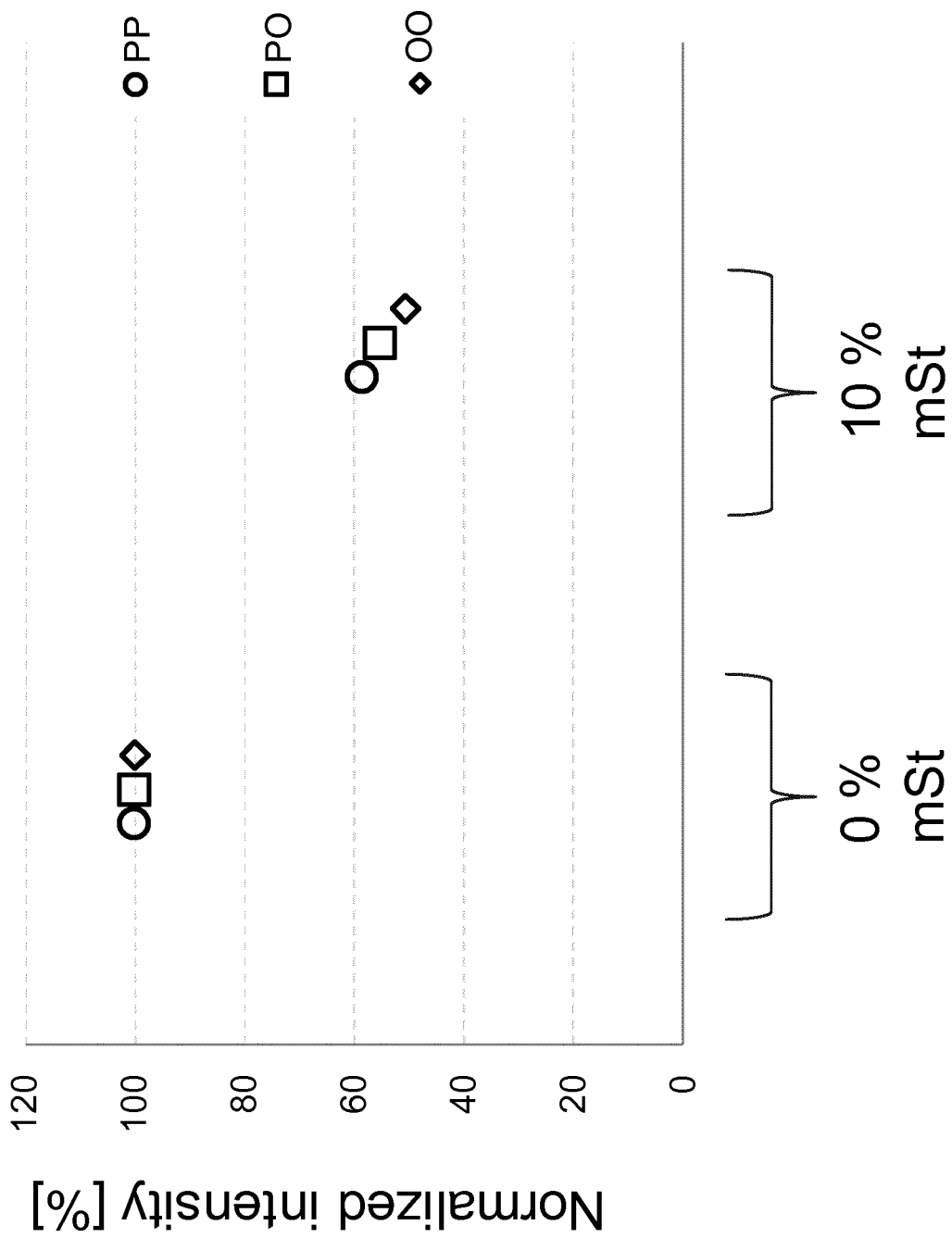
FIG. 18—MCPDEs observed in the heated crude industrially produced palm oil before and after removing the organochlorines.

The same samples were also subjected to heat treatment in ampoules in order to simulate the formation of MCPDEs and were analysed by LC-MS for their MCPDE content accordingly. The benefits of the mitigation on the resulting MCPDE levels are shown in FIG. 18.

Example 5

Cold Pressed Crude Canola Seed Oil

Production of cold pressed crude canola oil: 7.9 kg of canola seeds were pressed using a home electrical oil press (OP 700, Rommelsbacher, Germany) resulting in ~2.4 kg of pressed oil and ~5.5 kg of dry matter. The pressed oil was then filtered through filter paper (Whatman 595%) at 60° C. in the oven.

Figure 19:
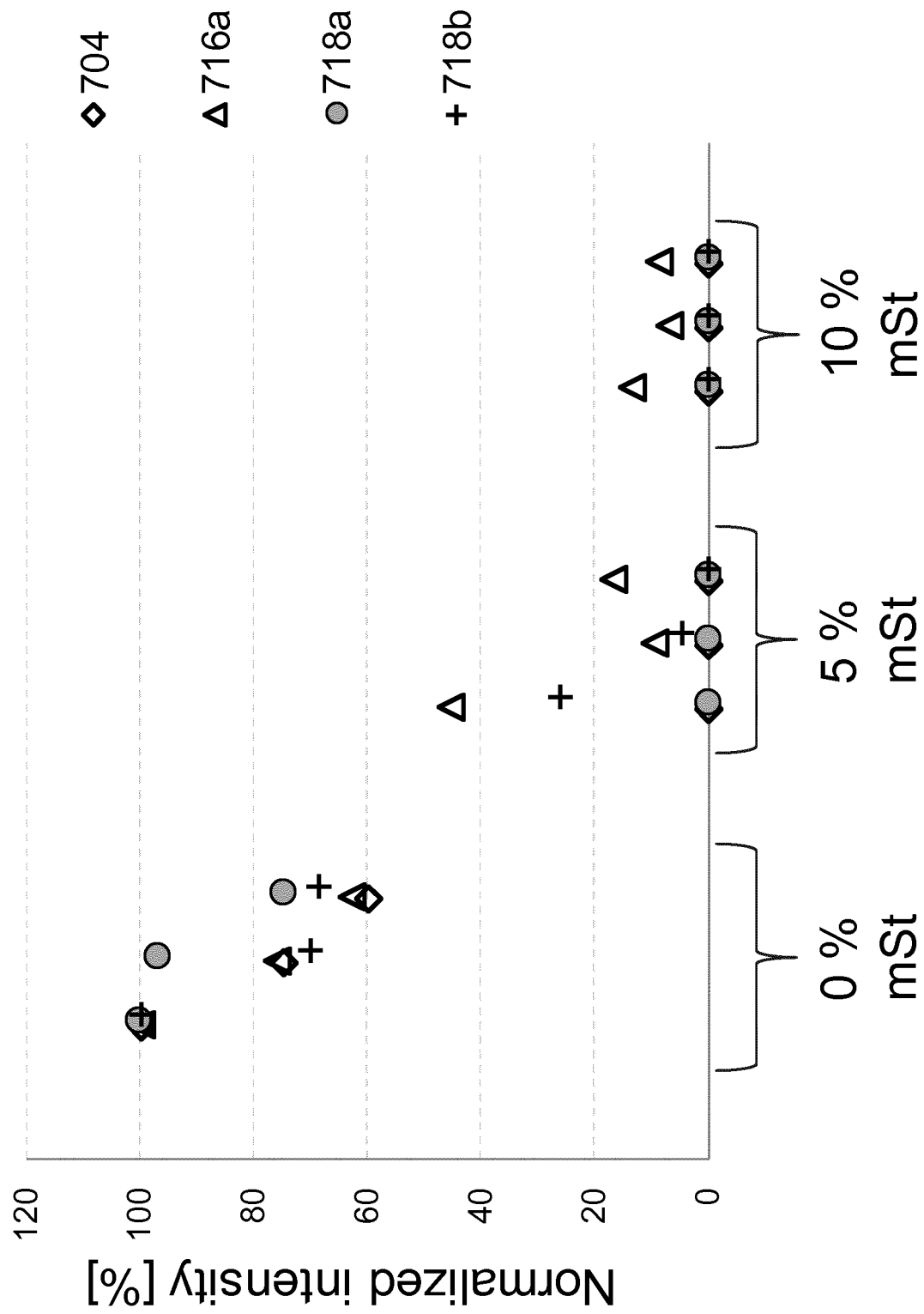
FIG. 19—Removal of chlorinated precursors with the trapping concept from "cold-pressed crude canola seed oil".

Mitigation trials were performed with mono-stearin as trapping agent, by adding 5% or 10% w/w of commercially available monostearin (Dimodan HS K-A from Danisco) to the crude canola oil. The mixture was heated to 80° C. to allow complete melting. The sample was then incubated for 16 h at room temperature. The crystallised solid and liquid phases were separated by centrifugation at 10,000 g for 20 min at 23° C. The resulting samples were analysed by LC-MS as described above in Example 3 for their precursor content. The effect of mitigation on the precursor levels is shown in FIG. 19.

Example 6

Water Degummed Industrially Produced Crude Palm Oil

Industrially produced crude palm oil was purchased from Nutriswiss (Lyss, Switzerland).

The crude oil was first heated at 80° C. and then sheared with a high shear mixer (Silverson L5M-A) at 1000 rpm for 25 min while maintaining the crude oil at 70° C. and adding 3% heated MilliQ water (v/v). Then the oil was centrifuged at 15,000 g for 15 min at 40° C. The upper oil phase was taken off and used for further mitigation trials.

Figure 20:
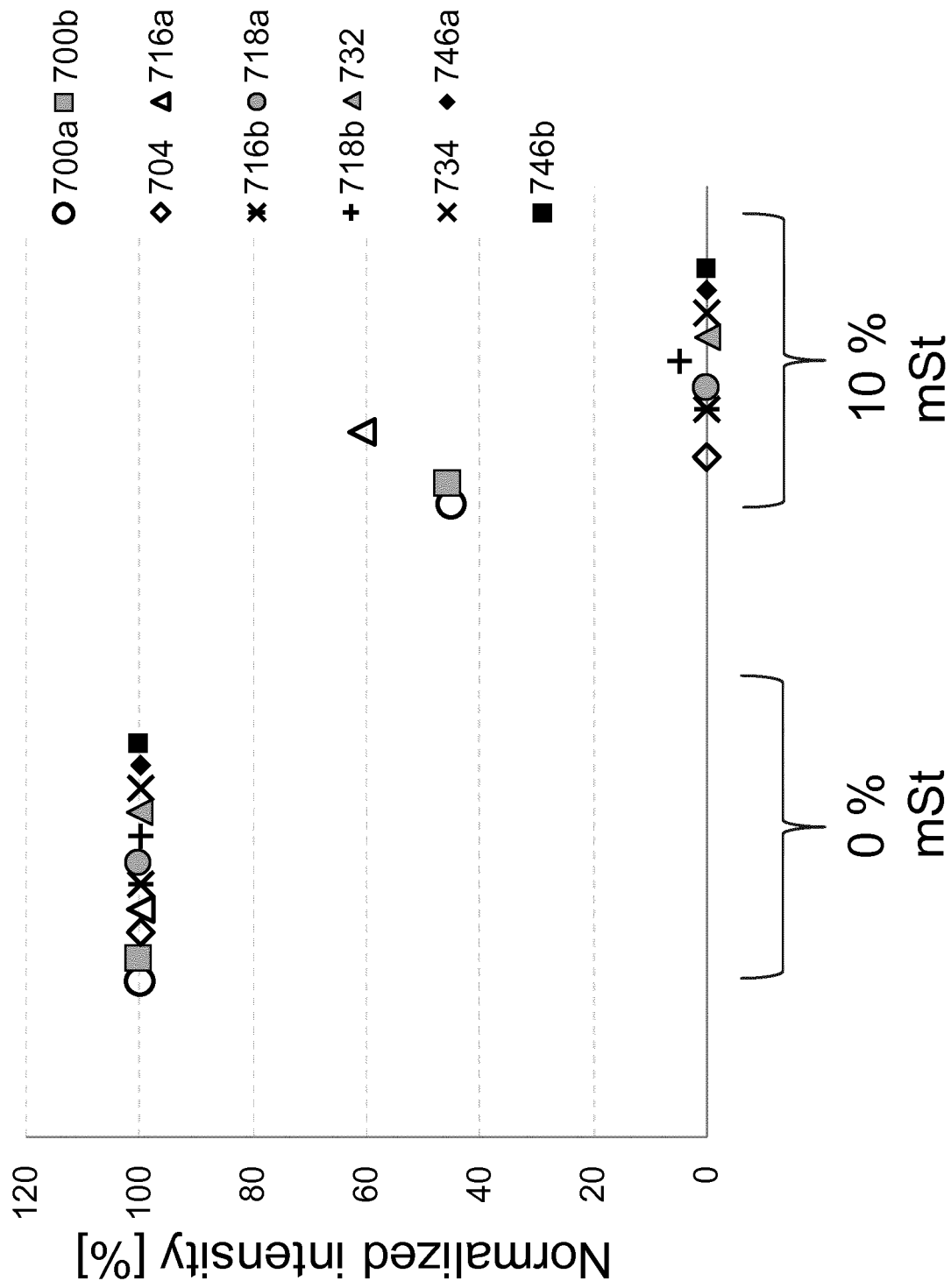
FIG. 20—Removal of chlorinated precursors with the trapping concept from "water degummed industrially produced crude palm oil".

Mitigation was performed by adding 10% w/w of commercially available monostearin (Dimodan HS K-A from Danisco) to the oil. The mixture was heated to 80° C. to allow complete melting. The sample was then incubated for 16 h at 40° C. The crystallized solid and liquid phases were separated by centrifugation at 10,000 g for 20 min at 40° C. The resulting samples were analysed by LC-MS as described above in Example 3 for their precursor content. The effect of mitigation on the precursor levels is shown in FIG. 20.

Figure 21:
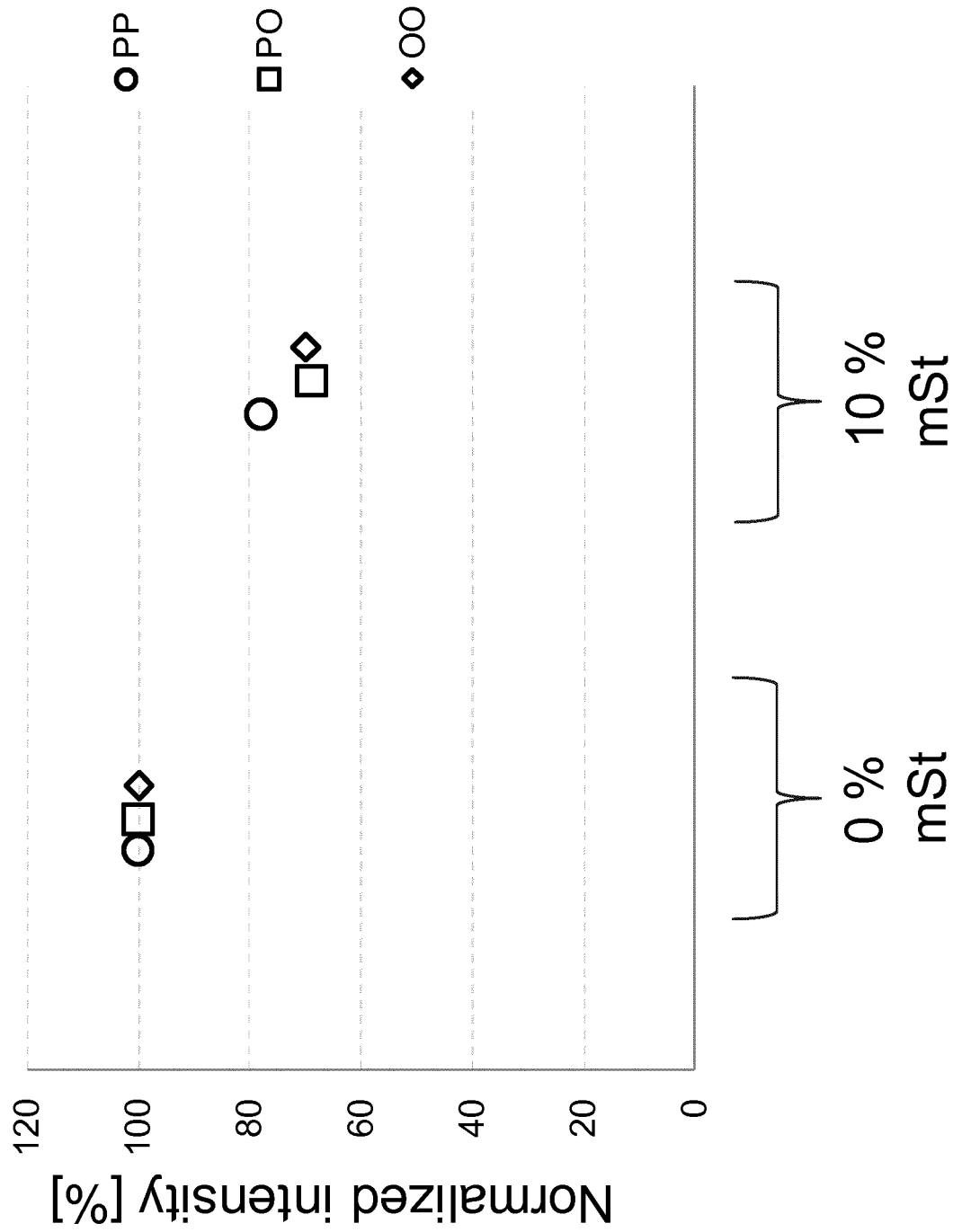
FIG. 21—MCPDEs observed in the heated "water degummed crude industrially produced palm oil" before and after removing the organochlorines.

The same samples were also subjected to heat treatment in ampoules in order to simulate the formation of MCPDEs and were analysed by LC-MS for their MCPDE content accordingly. The benefits of the mitigation on the resulting MCPDE levels are shown in FIG. 21.

Example 7

Water Degummed and Acid Degummed Industrially Produced Crude Palm Oil

Industrially produced crude palm oil was purchased from Nutriswiss (Lyss, Switzerland). The crude oil was first heated at 80° C. and then centrifuged at 15,000 g for 15 min at 40° C. The upper 90 v/v % liquid phase was immediately separated from the sediment and further used for degumming.

The crude oil was first heated at 80° C. and then sheared with a high shear mixer (Silverson L5M-A) at 1000 rpm for 25 min while maintaining the crude oil at 70° C. and adding 3% heated MilliQ water (v/v). Then the oil was centrifuged at 15,000 g for 15 min at 40° C. The upper oil phase was taken off and used for subsequent acid degumming.

The water degummed oil was heated at 80° C. Then 0.02% phosphoric acid 85% (v/v) was added and the mixture was sheared with a shear mixer (Silverson L5M-A) at 1000 rpm for 10 min while maintaining the crude oil at 85° C. Then the mixture was let cool down to 35° C. and 1% MilliQ water (v/v) was added. Finally the mixture was sheared at 1000 rpm for 15 min while maintaining the crude oil at 35° C. The resulting degummed oil was centrifuged at 15,000 g for 15 min at 40° C. The upper liquid phase was used for mitigation trials.

Figure 22:
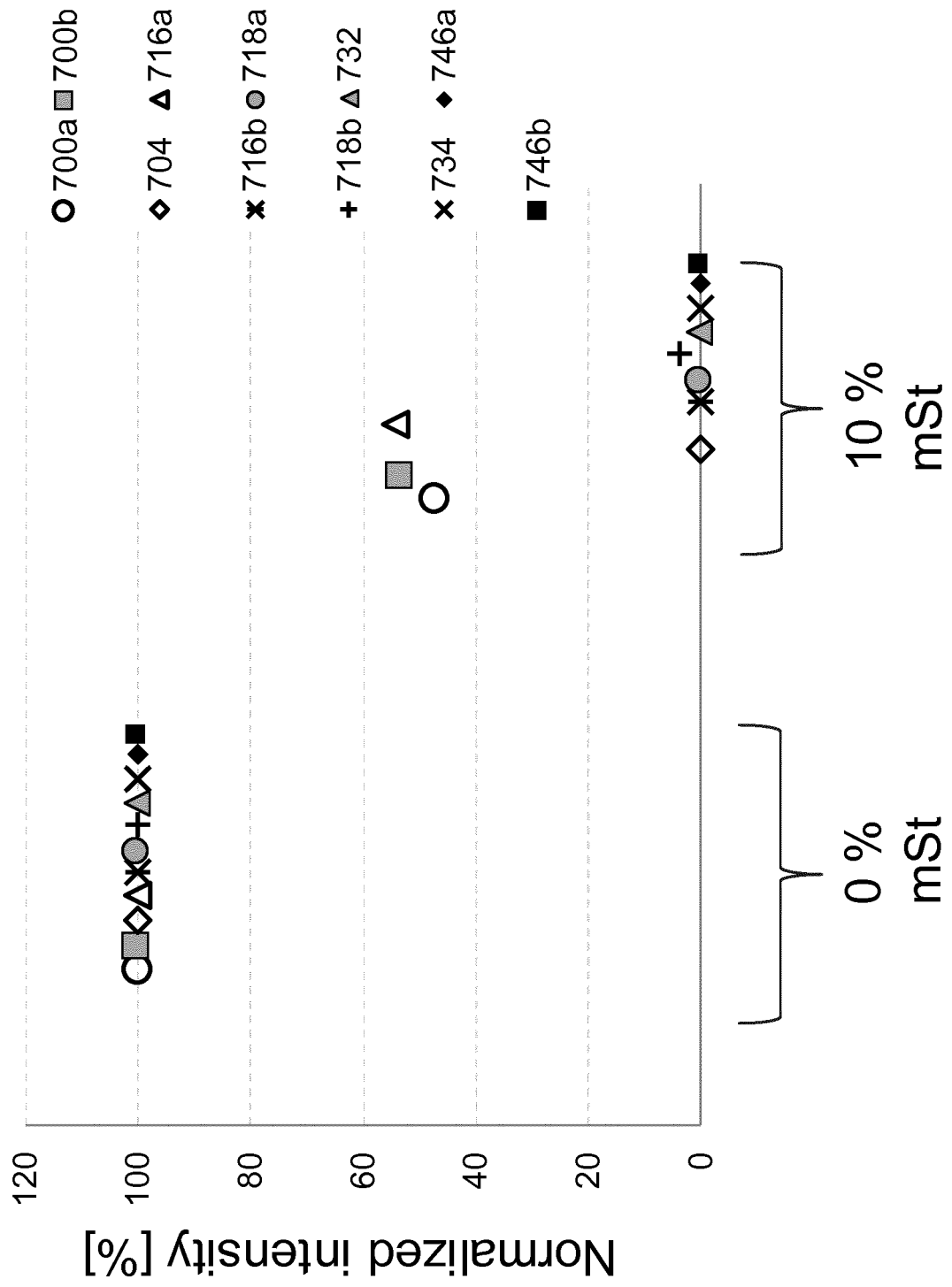
FIG. 22—Removal of chlorinated precursors with the trapping concept from "water degummed and acid degummed industrially produced crude palm oil".

Mitigation was performed by adding 10% w/w of commercially available monostearin (Dimodan HS K-A from Danisco) to the oil. The mixture was heated to 80° C. to allow complete melting. The sample was then incubated for 16 h at 40° C. The crystallized solid and liquid phases were separated by centrifugation at 10,000 g for 20 min at 40° C. The resulting samples were analysed by LC-MS as described above in Example 3 for their precursor content. The effect of mitigation on the precursor levels is shown in FIG. 22.

Figure 23:
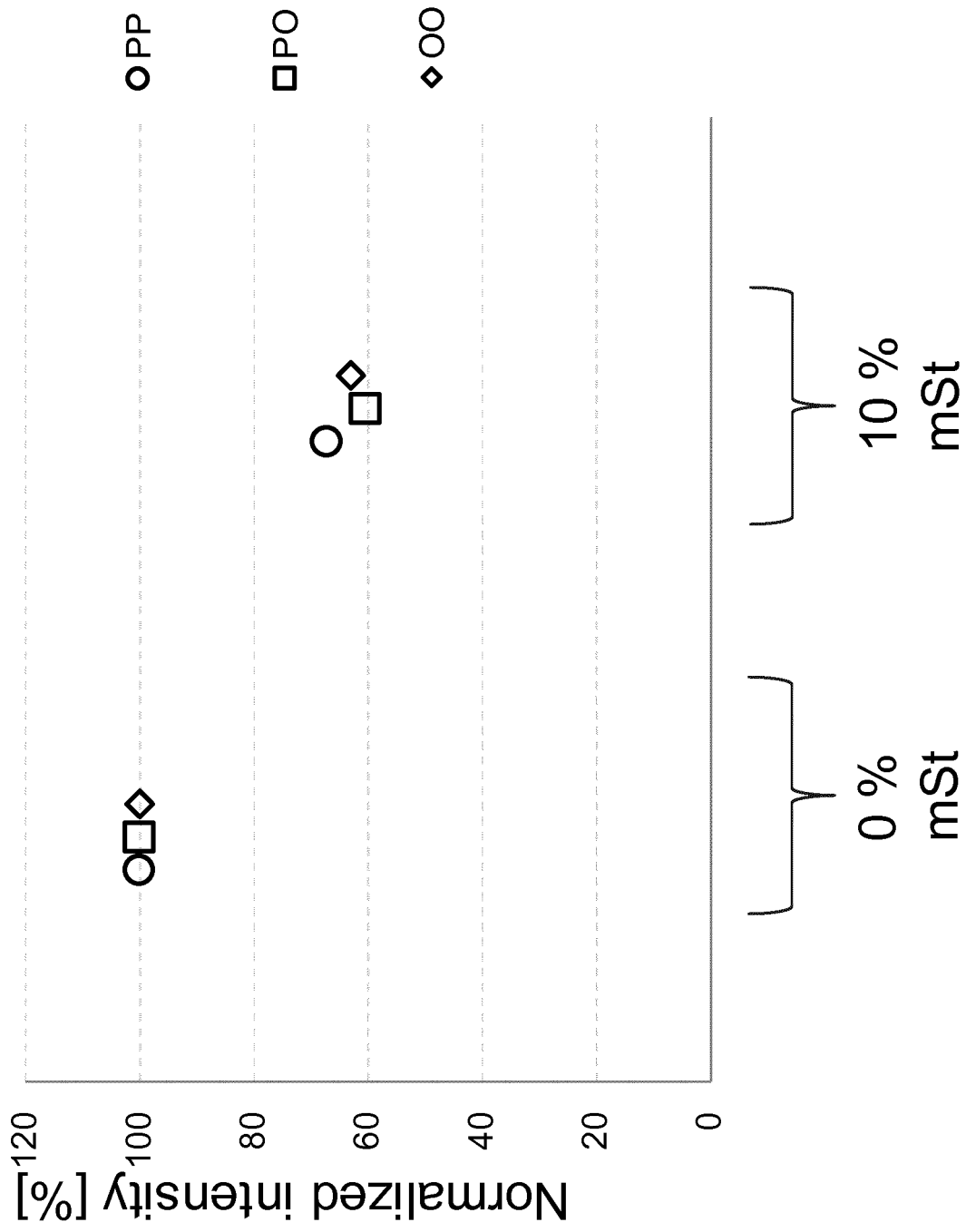
FIG. 23—MCPDEs observed in the heated "water degummed and acid degummed crude industrially produced palm oil" before and after removing the organochlorines.

The same samples were also subjected to heat treatment in ampoules in order to simulate the formation of MCPDEs and were analysed by LC-MS for their MCPDE content accordingly. The benefits of the mitigation on the resulting MCPDE levels are shown in FIG. 23.

Example 8

Acid Degummed Solvent Extracted Crude Palm Oil

Production of solvent extracted crude palm oil was performed as described above in Example 3. The crude oil was first heated at 80° C. and then centrifuged at 15,000 g for 15 min at 40° C. The upper 90 v/v % liquid phase was immediately separated from the sediment and further used for degumming.

Degumming of this oil was performed by first heating this oil to 80° C. and adding 0.02% phosphoric acid 85% (v/v). Then this mixture was sheared with a shear mixer (Silverson L5M-A) at 1000 rpm for 10 min while maintaining the crude oil at 85° C. Then the mixture was let cool down to 35° C. and 1% MilliQ water (v/v) was added. Finally the mixture was sheared at 1000 rpm for 15 min while maintaining the crude oil at 35° C. The resulting degummed oil was centrifuged at 15,000 g for 15 min at 40° C. The upper liquid phase was used for mitigation trials.

Figure 24:
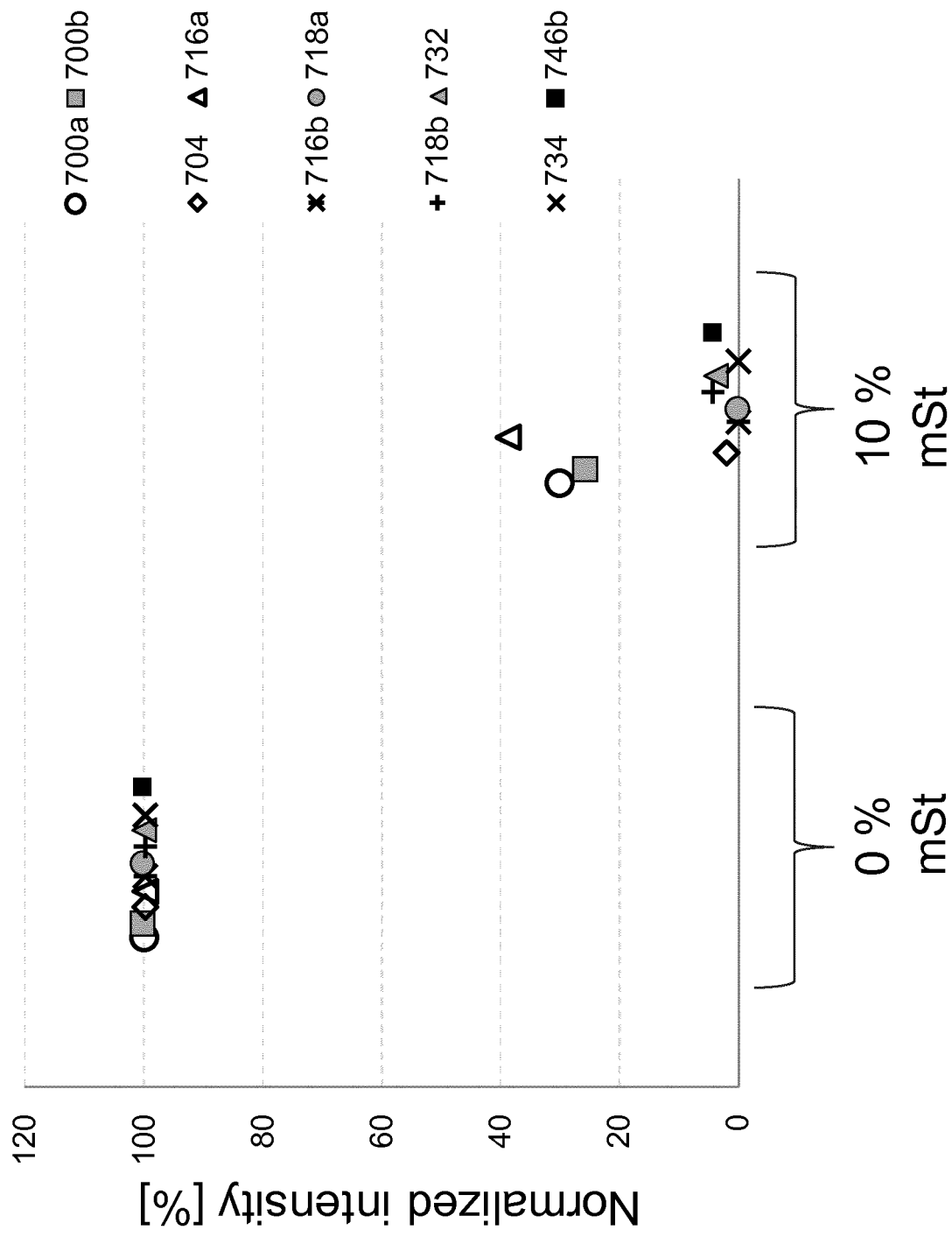
FIG. 24—Removal of chlorinated precursors with the trapping concept from "acid degummed solvent extracted crude palm oil".

Mitigation was performed by adding 10% w/w of commercially available monostearin (Dimodan HS K-A from Danisco) to the oil. The mixture was heated to 80° C. to allow complete melting. The sample was then incubated for 16 h at 40° C. The crystallized solid and liquid phases were separated by centrifugation at 10,000 g for 20 min at 40° C. The resulting samples were analysed by LC-MS as described above in Example 3 for their precursor content. The effect of mitigation on the precursor levels is shown in FIG. 24.

Figure 25:
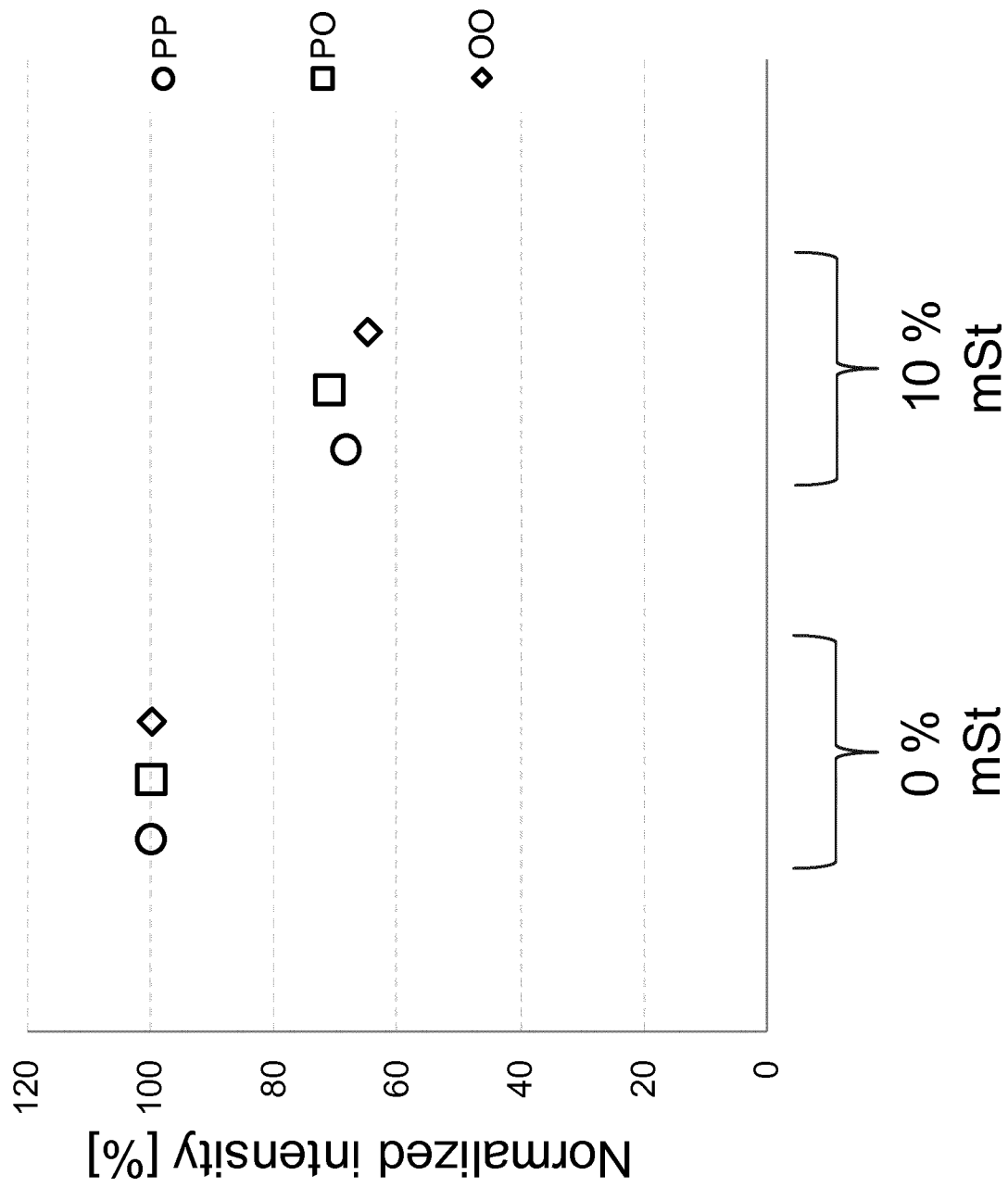
FIG. 25—MCPDEs observed in the heated "acid degummed solvent extracted crude palm oil" before and after removing the organochlorines.

The same samples were also subjected to heat treatment in ampoules in order to simulate the formation of MCPDEs and were analysed by LC-MS for their MCPDE content accordingly. The benefits of the mitigation on the resulting MCPDE levels are shown in FIG. 25.

Example 9

Acid Degummed Industrially Produced Crude Palm Oil

Industrially produced crude palm oil was purchased from Nutriswiss (Lyss, Switzerland). The crude oil was first heated at 80° C. and then centrifuged at 15,000 g for 15 min at 40° C. The upper 90 v/v % liquid phase was immediately separated from the sediment and further used for degumming.

Degumming of this oil was performed by first heating this oil to 80° C. and adding 0.02% phosphoric acid 85% (v/v). Then this mixture was sheared with a shear mixer (Silverson L5M-A) at 1000 rpm for 10 min while maintaining the crude oil at 85° C. Then the mixture was let cool down to 35° C. and 1% MilliQ water (v/v) was added. Finally the mixture was sheared at 1000 rpm for 15 min while maintaining the crude oil at 35° C. The resulting degummed oil was centrifuged at 15,000 g for 15 min at 40° C. The upper liquid phase was used for mitigation trials.

Figure 26:
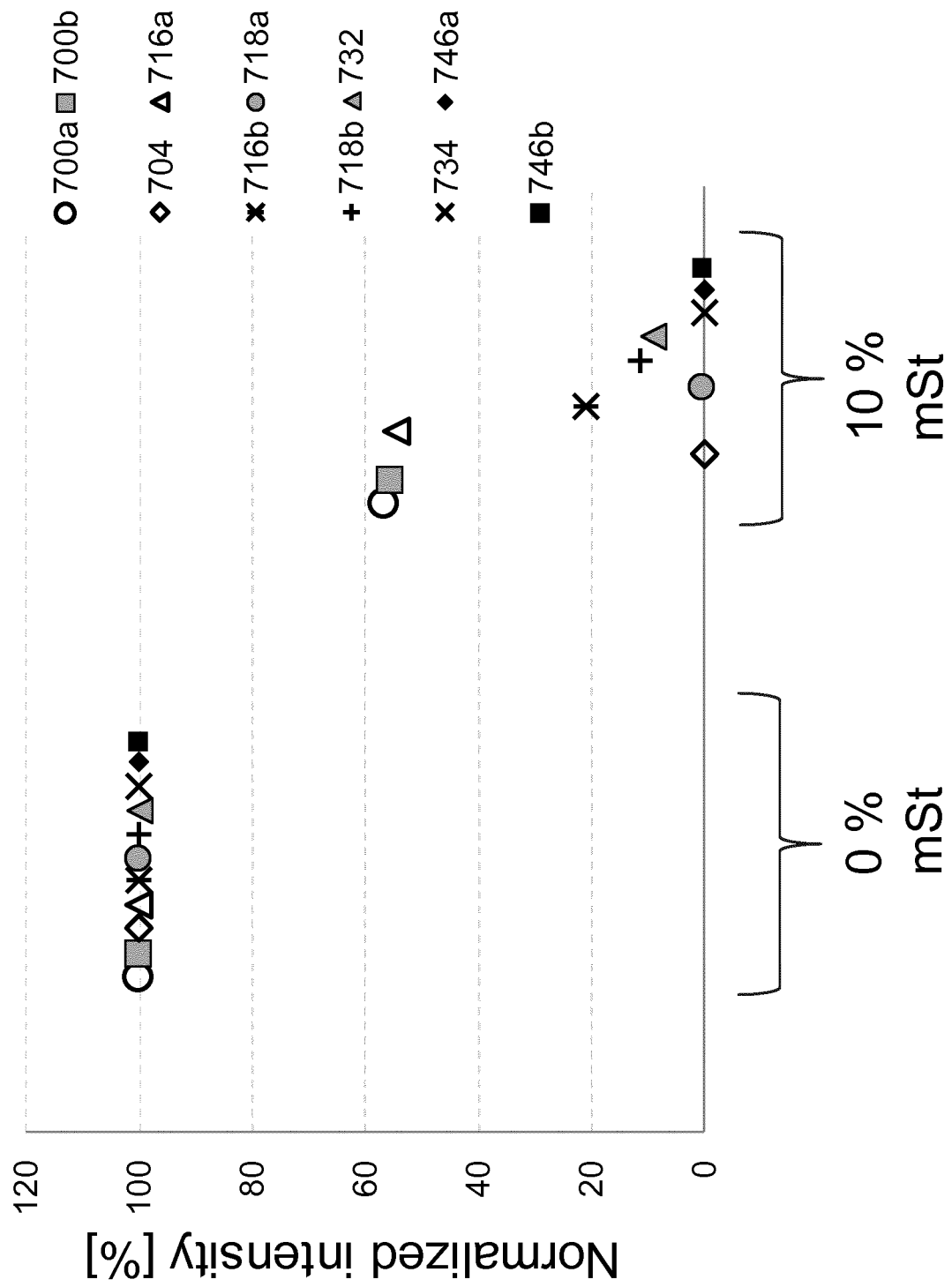
FIG. 26—Removal of chlorinated precursors with the trapping concept from "acid degummed industrially produced crude palm oil".

Mitigation was performed by adding 10% w/w of commercially available monostearin (Dimodan HS K-A from Danisco) to the oil. The mixture was heated to 80° C. to allow complete melting. The sample was then incubated for 16 h at 40° C. The crystallized solid and liquid phases were separated by centrifugation at 10,000 g for 20 min at 40° C. The resulting samples were analysed by LC-MS as described above in Example 3 for their precursor content. The effect of mitigation on the precursor levels is shown in FIG. 26.

Figure 27:
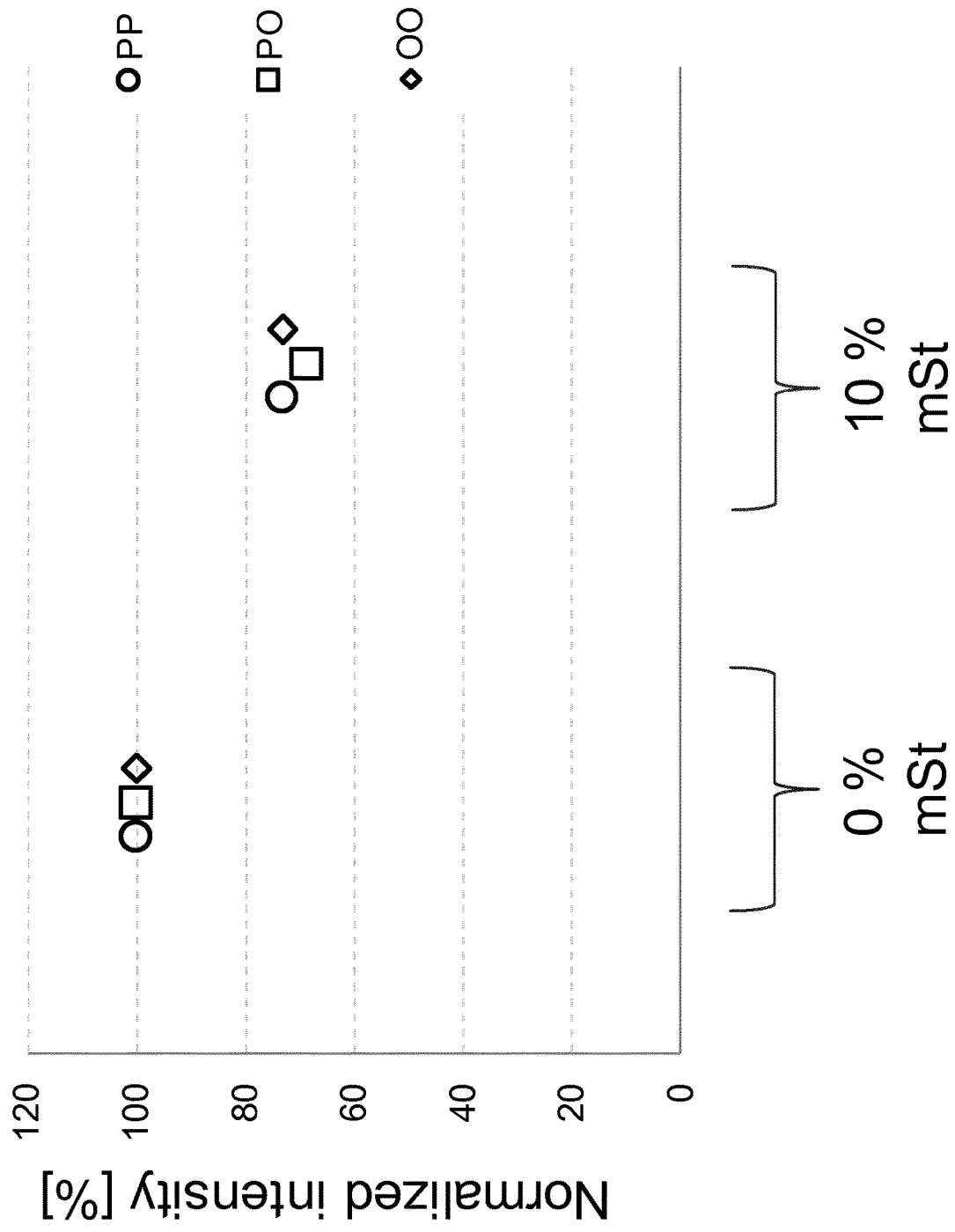
FIG. 27—MCPDEs observed in the heated "acid degummed industrially produced crude palm oil" before and after removing the organochlorines.

The same samples were also subjected to heat treatment in ampoules in order to simulate the formation of MCPDEs and were analysed by LC-MS for their MCPDE content accordingly. The benefits of the mitigation on the resulting MCPDE levels are shown in FIG. 27.

Example 10

Neutralized (Alkali Treated as in Alkaline/Chemical Refining) Oil Made from Industrially Produced Crude Palm Oil Industrially produced crude palm oil was purchased from Nutriswiss (Lyss, Switzerland).

The crude palm oil was first heated to 80° C. and then centrifuged 15,000 g for 15 min at 40° C. The crude palm oil was shear-mixed with a high shear mixer (Silverson L5M-A) at 1000 rpm for 10 min while maintaining the crude oil at 85° C. Then 0.02% phosphoric acid 85% (v/v) was added to the crude palm oil and the resulting mixture was sheared at 1000 rpm for 15 min while maintaining temperature at 85° C. Then 5% NaOH 2M (v/v) was added and the mixture was further sheared at 1000 rpm for 15 sec while maintaining the temperature at 75° C. The mixture was then centrifuged at 15,000 g for 15 min at 40° C. The upper phase was taken off, mixed with 10% of 75° C. pre-heated MilliQ water (v/v) and shear-mixed again at 1000 rpm for 2 min while maintaining the temperature at 75° C. The resulting mixture was centrifuged at 15,000 g for 15 min at 40° C. and the upper liquid phase (neutralized oil) was used for mitigation trials.

Figure 28:
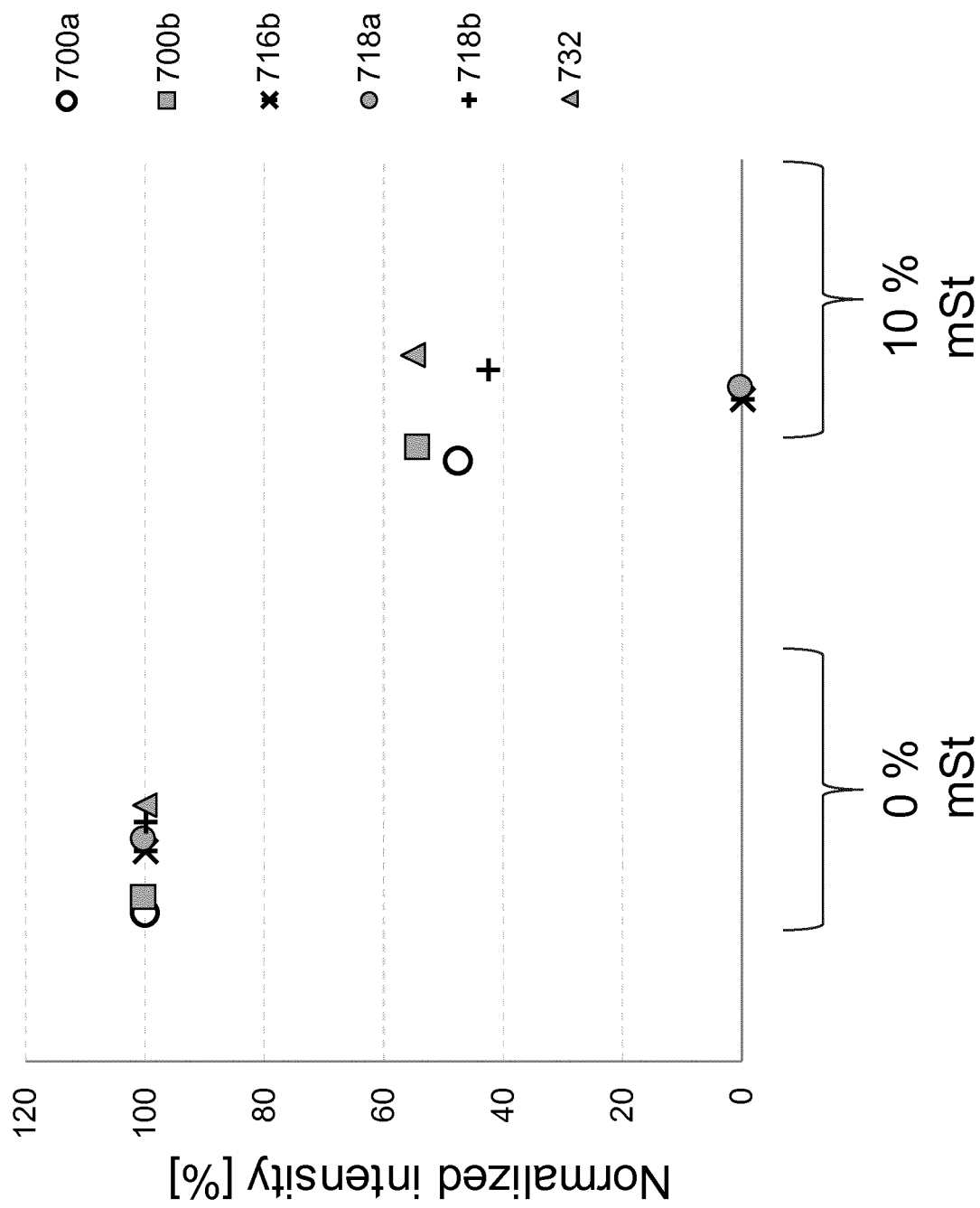
FIG. 28—Removal of chlorinated precursors with the trapping concept from "neutralized (alkali treated) industrially produced crude palm oil".

Mitigation was performed by adding 10% w/w of commercially available monostearin (Dimodan HS K-A from Danisco) to the oil. The mixture was heated to 80° C. to allow complete melting. The sample was then incubated for 16 h at 40° C. The crystallized solid and liquid phases were separated by centrifugation at 10,000 g for 20 min at 40° C. The resulting samples were analysed by LC-MS as described above in Example 3 for their precursor content. The effect of mitigation on the precursor levels is shown in FIG. 28.

Example 11

Neutralized (Alkali Treated as in Alkaline/Chemical Refining) Oil Made from Solvent Extracted Crude Palm Oil Production of solvent extracted crude palm oil was performed as described above in Example 3.

The crude palm oil was first heated to 80° C. and then centrifuged 15,000 g for 15 min at 40° C. The crude palm oil was shear-mixed with a high shear mixer (Silverson L5M-A) at 1000 rpm for 10 min while maintaining the crude oil at 85° C. Then 0.02% phosphoric acid 85% (v/v) was added to the crude palm oil and the resulting mixture was sheared at 1000 rpm for 15 min while maintaining temperature at 85° C. Then 5% NaOH 2M (v/v) was added and the mixture was further sheared at 1000 rpm for 15 sec while maintaining the temperature at 75° C. The mixture was then centrifuged at 15,000 g for 15 min at 40° C. The upper phase was taken off, mixed with 10% of 75° C. pre-heated MilliQ water (v/v) and shear-mixed again at 1000 rpm for 2 min while maintaining the temperature at 75° C. The resulting mixture was centrifuged at 15,000 g for 15 min at 40° C. and the upper liquid phase (neutralized oil) was used for mitigation trials.

Figure 29:
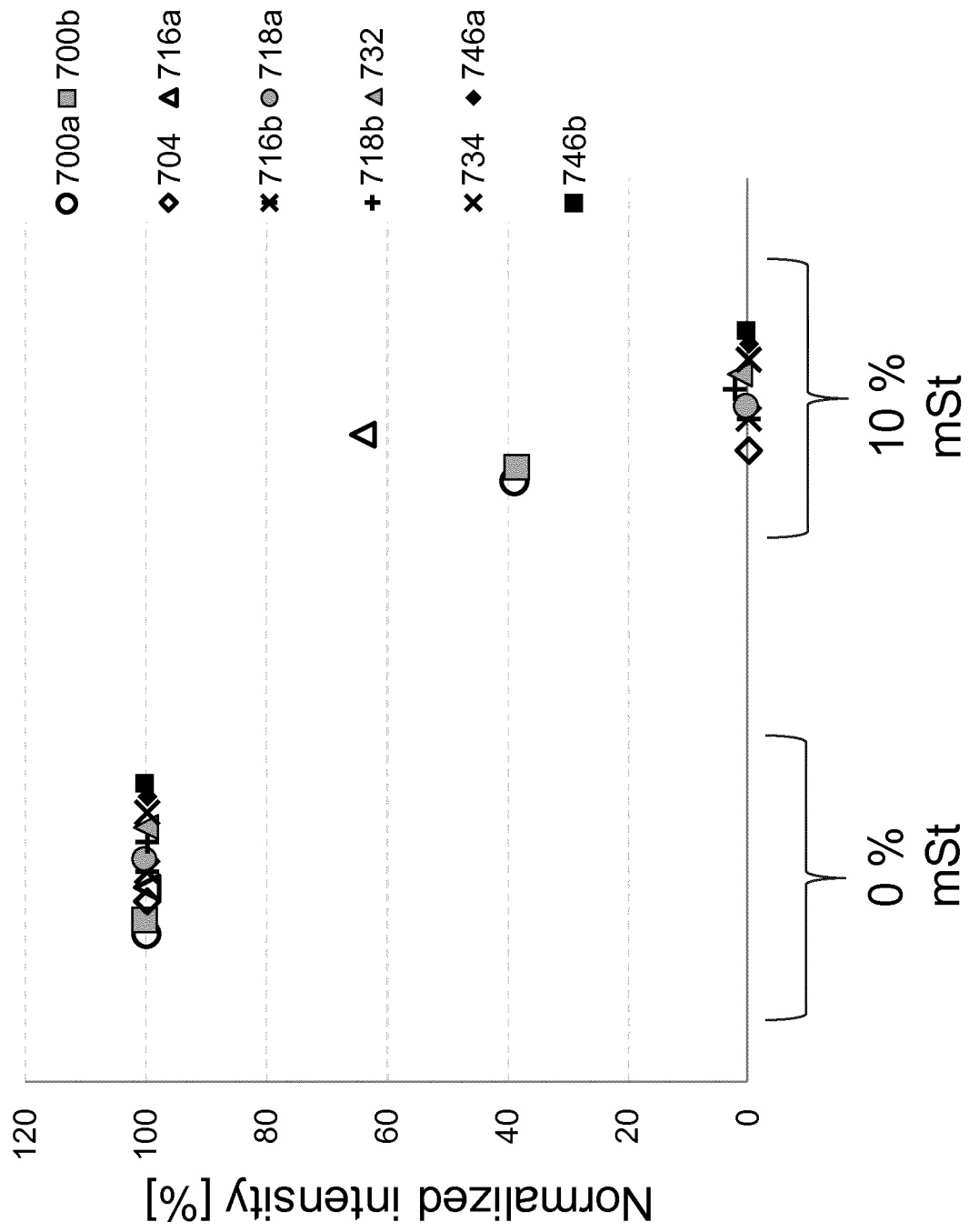
FIG. 29—Removal of chlorinated precursors with the trapping concept from "neutralized (alkali treated) solvent extracted crude palm oil".

Mitigation was performed by adding 10% w/w of commercially available monostearin (Dimodan HS K-A from Danisco) to the oil. The mixture was heated to 80° C. to allow complete melting. The sample was then incubated for 16 h at 40° C. The crystallized solid and liquid phases were separated by centrifugation at 10,000 g for 20 min at 40° C. The resulting samples were analysed by LC-MS as described above in Example 3 for their precursor content. The effect of mitigation on the precursor levels is shown in FIG. 29.

REFERENCES

Crews C, Chiodini A, Granvogl M, Hamlet C, Hrncirik K, Kuhlmann J, Lampen A, Scholz G, Weisshaar R, Wenzl T, et al. 2013. Analytical approaches for MCPD esters and glycidyl esters in food and biological samples: a review and future perspectives. Food Addit Contam Part A Chem Anal Control Expo Risk Assess. 30:11-45.

Destaillats F, Craft B D, Sandoz L, Nagy K. 2012. Formation mechanisms of Monochloropropanediol (MCPD) fatty acid diesters in refined palm (*Elaeis guineensis*) oil and related fractions. Food Additives & Contaminants: Part A. 29:29-37.

Ermacora A, Hrncirik K. 2014. Influence of oil composition on the formation of fatty acid esters of 2-chloropropane-1,3-diol (2-MCPD) and 3-chloropropane-1,2-diol (3-MCPD) under conditions simulating oil refining. Food Chemistry. 161:383-389.

FEDIOL. 2015. MCPD ESTERS AND GLYCIDYL ESTERS—Review of mitigation measures—Revision 2015. FEDIOL. Ref. 15SAF108.

Franke K, Strijowski U, Fleck G, Pudel F. 2009. Influence of chemical refining process and oil type on bound 3-chloro-1,2-propanediol contents in palm oil and rapeseed oil. Food Sci Technol. 2009; 42:1751-1754.

Freudenstein A, Weking J, Matthäus B. 2013. Influence of precursors on the formation of 3-MCPD and glycidyl esters in a model oil under simulated deodorization conditions. European Journal of Lipid Science and Technology. 115:286-294.

Habermeyer M, Gruth S, Eisenbrand G. 2011. Identification of gaps in knowledge concerning toxicology of 3-MCPD and glycidol esters. Eur J Lipid Sci Technol. 2011; 113: 314-318.

Hamlet C G, Asuncion L, Velíšek J, Doležal M, Zelinková Z, Crews C. 2011. Formation and occurrence of esters of 3-chloropropane-1,2-diol (3-CPD) in foods: What do we know and what we assume. Eur J Lipid Sci Technol. 2011; 113:279-303.

Hudson B J F. 1993. Fatty acids/Properties. In: Encyclopedia of Food Science, Food Technology and Nutrition: Academic Press. p. 2297-2300.

Hwang M, Yoon E, Kim J, Jang D D, Yoo T M. 2009. Toxicity value for 3-monochloropropane-1,2-diol using a benchmark dose methodology. Regulatory Toxicology and Pharmacology. 53:102-106.

Lynch B S, Bryant D W, Hook G J, Nestmann E R, Mundro I C. 1998. Carcinogenicity of monochloro-1,2-propanediol (a-chlorohydrin, 3-MCPD). Int J Toxicol. 1998; 17:47-76.

Matthäus B, Pudel F. 2013. Mitigation of 3-MCPD and glycidyl esters within the production chain of vegetable oils especially palm oil. Lipid Technology. 25:151-155.

Nagy K, Sandoz L, Craft B D, Destaillats F. 2011. Mass defect filtering of isotope signatures reveals the source of chlorinated palm oil contaminants. Food Addit Contam. 2011.

Rahn A K K, Yaylayan V A. 2011. What do we know about the molecular mechanism of 3-MCPD ester formation? Eur J Lipid Sci Technol. 2011; 113:323-329.

Ramli M, Siew W, Ibrahim N, Hussein R, Kuntom A, Abd. Razak R, Nesaretnam K. 2011. Effects of Degumming and Bleaching on 3-MCPD Esters Formation During Physical Refining. Journal of the American Oil Chemists' Society. 88:1839-1844.

Rossi M, Gianazza M, Alamprese C, Stanga F. 2003. The role of bleaching clays and synthetic silica in palm oil physical refining. Food Chemistry. 82:291-296.

Science GFfFLaF. 2016. Toolbox for the Mitigation of 3-MCPD Esters and Glycidyl Esters in Food—Bund für Lebensmittelrecht und Lebensmittelkunde e. V. (BLL)

Shimizu M, Weitkamp P, Vosmann K, Matthäus B. 2013. Influence of chloride and glycidyl-ester on the generation of 3-MCPD- and glycidyl-esters. European Journal of Lipid Science and Technology. 115:735-739.

Stadler R H. 2015. Monochloropropane-1,2-diol esters (MCPDEs) and glycidyl esters (GEs): an update. Current Opinion in Food Science. 6:12-18.

Tiong S H, Saparin N, Teh H F, Ng T L M, Md Zain M Z B, Neoh B K, Md Noor A, Tan C P, Lai O M, Appleton D R. 2018. Natural Organochlorines as Precursors of 3-Monochloropropanediol Esters in Vegetable Oils. Journal of agricultural and food chemistry. 66:999-1007.

Weisshaar R. 2008. 3-MCPD-esters in edible fats and oils—a new and worldwide problem. Eur J Lipid Sci Technol. 2008; 110:671-672.

Weisshaar R. 2011. Fatty acid esters of 3-MCPD: Overview of occurrence and exposure estimates. Eur J Lipid Sci Technol. 2011; 113:304-308.

Wong, Muhamad, Abas, Lai, Nyam, Tan. 2017. Effects of temperature and NaCl on the formation of 3-MCPD esters and glycidyl esters in refined, bleached and deodorized palm olein during deep-fat frying of potato chips. Food Chemistry. 219:126-130.

Zelinková Z, Svejkovská B, Velíšek J, Doležal M. 2006. Fatty acid esters of 3-chloropropane-1,2-diol in edible oils. Food Addit Contam. 12/2006; 23:1290-1298.

All publications mentioned in the specification are herein incorporated by reference. Various modifications and variations of the disclosed methods, uses and products of the invention will be apparent to the skilled person without departing from the scope and spirit of the invention. Although the invention has been disclosed in connection with specific preferred embodiments, it should be understood that the invention as claimed should not be unduly limited to such specific embodiments. Indeed, various modifications of the disclosed modes for carrying out the invention, which are obvious to the skilled person are intended to be within the scope of the following claims.

The invention claimed is:

1. A method for purification of a triacylglyceride oil, the method comprising:
(a) admixing the triacylglyceride oil with an auxiliary trapping agent in an amount of at least 2 wt % of the triacylglyceride oil to form a mixture, wherein the auxiliary trapping agent comprises at least one compound selected from the group consisting of a monoacylglyceride, a diacylglyceride and a free fatty acid, wherein a first melting temperature of the triacylglyceride oil and a second melting temperature of the auxiliary trapping agent are substantially different, the auxiliary trapping agent is soluble in the triacylglyceride oil, and the auxiliary trapping agent is more polar than the triacylglyceride oil;
(b) (i) crystallising the auxiliary trapping agent by cooling the mixture of step (a) below the second melting temperature of the auxiliary trapping agent to form a product, wherein the second melting temperature of the auxiliary trapping agent is higher than the first melting temperature of the triacylglyceride oil; or
(ii) crystallising the triacylglyceride oil by cooling the mixture of step (a) below the first melting temperature of the triacylglyceride oil to form the product, wherein first melting temperature of the triacylglyceride oil is than the second melting temperature of the auxiliary trapping agent; and
(c) separating solid and liquid phases of the product of step (b) to form a purified triacylglyceride oil.

2. The method of claim 1, wherein a quantity of chlorinated precursors of monochloropropandiol esters (MCPDEs) is reduced in the purified triacylglyceride oil compared to the starting triacylglyceride oil.

3. The method of claim 1, wherein the second melting temperature of the auxiliary trapping agent is at least 10° C. higher than the first melting temperature of the triacylglyceride oil.

4. The method of claim 1, wherein a difference in log $P_{oct/wat}$ between the auxiliary trapping agent and the triacylglyceride oil is at least 1.

5. The method of claim 1, wherein the auxiliary trapping agent comprises a glyceride.

6. The method of claim 1, wherein the triacylglyceride oil is selected from the group consisting of a plant oil, an animal oil, a fish oil, an algal oil, and combinations thereof.

7. The method of claim 1, wherein the admixing of step (a) comprises heating the mixture to a temperature greater than the first melting temperature of the triacylglyceride oil and the second melting temperature of the auxiliary trapping agent, and/or homogenising the mixture.

8. The method of claim 1, wherein the separating of step (c) comprises centrifuging, decanting and/or filtering.

9. The method of claim 1, wherein a pH of the triacylglyceride oil is adjusted before step (b) to increase the polarity of chlorinated precursors of MCPDEs.

10. The method of claim 1 further comprising:

(d) one or more processes selected from the group consisting of physical or chemical refining, degumming, neutralization and bleaching.

11. A method for purification of a triacylglyceride oil, the method comprising mixing the triacylglyceride oil with an auxiliary trapping agent in an amount of at least 2 wt % of the triacylglyceride oil to form a mixture, wherein the auxiliary trapping agent comprises at least one compound selected from the group consisting of a monoacylglyceride, a diacylglyceride and a free fatty acid, wherein a first melting temperature of the triacylglyceride oil and a second melting temperature of the auxiliary trapping agent are substantially different, wherein the auxiliary trapping agent is soluble in the triacylglyceride oil, wherein the auxiliary trapping agent is more polar than the triacylglyceride oil, and wherein the purification comprises crystallising the auxiliary trapping agent or the triacylglyceride oil.

12. The method of claim 11, wherein the purification reduces a quantity of chlorinated precursors of monochloropropandiol esters (MCPDEs) in the purified triacylglyceride oil compared to the starting triacylglyceride oil.

13. The method of claim 11, wherein the second melting temperature of the auxiliary trapping agent is higher than the first melting temperature of the triacylglyceride oil, and wherein the auxiliary trapping agent is crystallised.

14. The method of claim 1, wherein the separating of step (c) comprises centrifuging.

15. The method of claim 1, wherein the admixing of step (c) comprises admixing the triacylglyceride oil with an auxiliary trapping agent in an amount of at least 4 wt % of the triacylglyceride oil to form the mixture.

16. The method of claim 1, wherein the admixing of step (c) comprises admixing the triacylglyceride oil with an auxiliary trapping agent in an amount of at least 8 wt % of the triacylglyceride oil to form the mixture.

* * * * *